United States Patent [19]
Hauck

[11] Patent Number: 5,515,079
[45] Date of Patent: May 7, 1996

[54] COMPUTER INPUT SYSTEM AND METHOD OF USING SAME

[75] Inventor: Lane Hauck, San Diego, Calif.

[73] Assignee: Proxima Corporation, San Diego, Calif.

[21] Appl. No.: 158,659

[22] Filed: Nov. 29, 1993

Related U.S. Application Data

[63] Continuation of Ser. No. 901,253, Jun. 19, 1992, abandoned, which is a continuation of Ser. No. 692,657, Apr. 29, 1991, abandoned, which is a continuation of Ser. No. 433,029, Nov. 7, 1989, abandoned.

[51] Int. Cl.$^6$ ................................................. G09G 5/08
[52] U.S. Cl. ............................. 345/157; 345/158; 345/9
[58] Field of Search .................................... 345/157, 156, 345/158, 162, 169, 180, 181, 182, 183; 348/734, 744; 356/375; 353/122, 28, 42–43; 434/323, 324, 337

[56] References Cited

U.S. PATENT DOCUMENTS

| | | |
|---|---|---|
| 3,885,096 | 5/1975 | Inuiya . |
| 4,280,135 | 7/1981 | Schlossberg . |
| 4,796,019 | 6/1989 | Auerbach . |
| 4,808,980 | 2/1989 | Drumm . |
| 4,846,694 | 7/1989 | Erhardt . |
| 4,930,888 | 6/1990 | Freisleben . |
| 5,091,773 | 2/1992 | Fouche et al. . |

FOREIGN PATENT DOCUMENTS

| | | |
|---|---|---|
| 2236132 | 2/1974 | Germany . |
| 59-68053 | 4/1984 | Japan . |
| 60-138628 | 7/1985 | Japan . |
| 0230228 | 11/1985 | Japan . |
| 61-156326 | 7/1986 | Japan . |

Primary Examiner—Richard Hjerpe
Assistant Examiner—Xiao M. Wu
Attorney, Agent, or Firm—Bernard L. Kleinke; Jerry R. Potts; Peter P. Scott

[57] ABSTRACT

A computer input system for a computer generating images appearing on a screen. For the purpose of modifying the images appearing on the screen, a light generating device causes an auxiliary light image to appear on the screen. An image sensor responds to the auxiliary image, and a circuit responds to the sensor for causing auxiliary image information to be stored concerning the auxiliary light image. Another circuit responds to the stored auxiliary image information to supply the auxiliary light image information to the computer for utilization therein.

100 Claims, 9 Drawing Sheets

EXECUTE

DETECT HSYNC

CALIBRATE

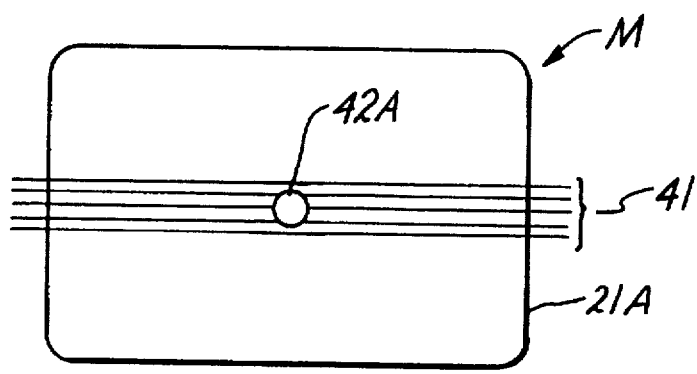
FIG. 10A
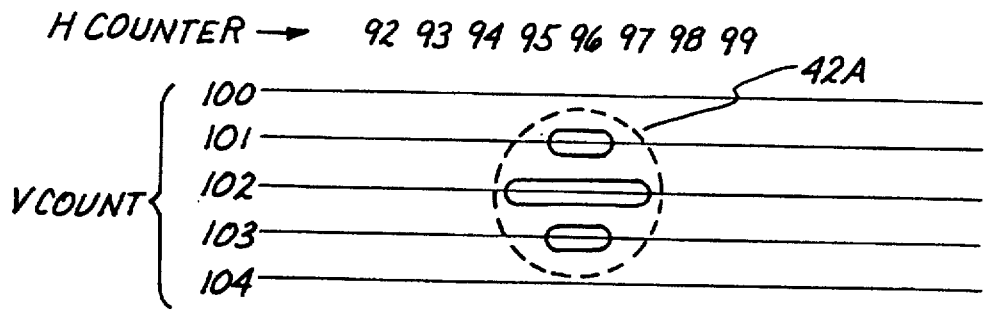
FIG. 10B
| DATA MEMORY DM30 | 101 | ← V=101 |
| DM31 | 96 | } ΔH=1 |
| DM32 | 97 | |
| DM33 | 102 | ← V=102 |
| DM34 | 95 | } ΔH=3 |
| DM35 | 98 | |
| DM36 | 103 | ← V=103 |
| DM37 | 96 | } ΔH=1 |
| DM38 | 97 | |
| DM39 | 0 | |
| DM40 | 0 | |
| DM41 | 0 | |
FIG. 10C

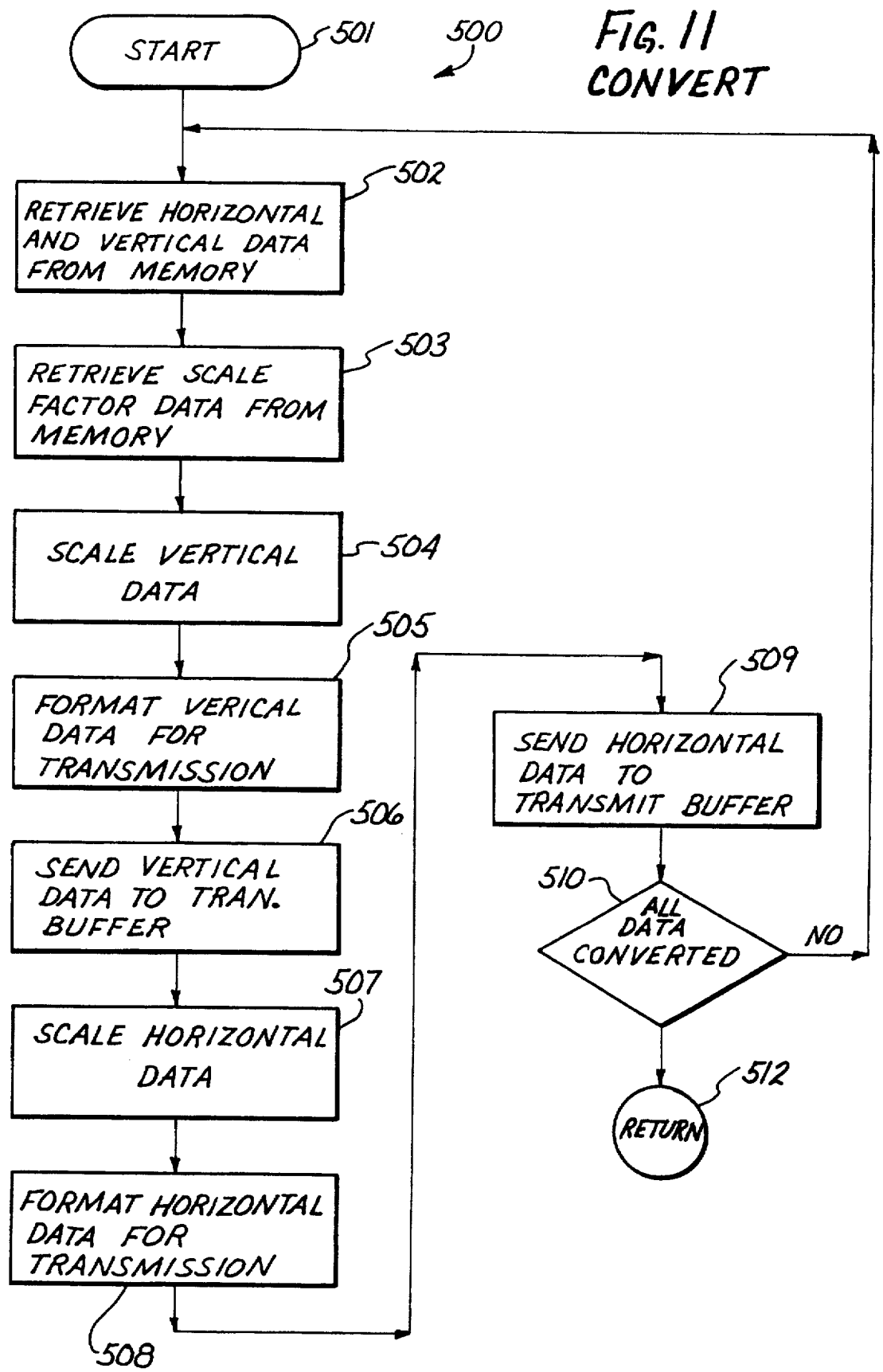
FIG. 11 CONVERT

COMPUTER INPUT SYSTEM AND METHOD OF USING SAME

This application is a continuation of U.S. patent application Ser. No. 07/901,253 filed Jun. 19, 1992, now abandoned, which is a continuation of U.S. patent application Ser. No. 07/692,657 filed Apr. 29, 1991, now abandoned, which is a continuation of U.S. patent Ser. No. 07/433,029 filed Nov. 7, 1989, now abandoned.

TECHNICAL FIELD

This invention relates to the general field of computer peripheral input systems, and the methods for using such systems and devices. More particularly, the present invention relates to such an input system and method for causing, by user manipulations, information to be communicated to a computer, which can then use the information for displaying computer generated images.

BACKGROUND ART

There have been many different types and kinds of computer input devices for entering information in a computer, by user manipulations of an input device, without the use of a keyboard. Such devices include absolute positioning devices such as light pens and digitized tablets, as well as relative positioning devices such as joysticks, track balls and mouse devices.

While such prior known devices may have been satisfactory for some applications, it would be highly desirable to be able to employ such devices in an interactive mode with a computer, being used with a projector to generate video images on a large screen for viewing by an audience. In this regard, when the computer generated images are projected onto a screen in a darkened room, it would be desirable to enter information into the computer to generate additional images during the presentation. For example, it would be desirable to underline or otherwise highlight the images projected onto the screen.

However, conventional auxiliary input devices are difficult to use in the dark. Also, there are limitations as to what information can be created by the computer in response to an auxiliary input device, such as a mouse.

There are typically two common approaches for projecting computer video signals onto a large viewing surface or screen, for an audience presentation. One method utilizes cathode ray tube based video projectors, such as the projectors manufactured by Electrohome, JVC, and Sony. Another technique utilizes liquid crystal display panels, in conjunction with overhead projectors such as the panels manufactured by Computer Accessories, Kodak and Sharp.

Such projection systems are typically used for demonstrating and training purposes, as well as for electronic slide shows. In the demonstration or training application, the projected image represents a "live" computer screen, and the operation of the computer or a software application program can be demonstrated to a group of people simultaneously. In this regard, the user of the equipment operates a computer, such as a conventional personal computer, in a conventional manner and whatever appears on the computer monitor screen, is duplicated on the large screen for all to see. In such an application, the user or presenter interacts with the computer, and must be positioned at the computer console to demonstrate the application program being executed by the computer.

It would, therefore, be highly desirable to permit a user to interact with the computer, without the requirement of being positioned at or near, a computer console, to modify or highlight the computer generated display images. In this regard, it would be advantageous for the user to be able to walk about the room, or be able to stand near the large screen, to direct the attention of the audience to certain images being displayed. At the same time, the user should be able to enter information conveniently into the computer generating the images, to cause such information to be projected onto the screen, during the presentation.

In the slide show application, a sequence of electronic slides is prepared before showing them to an audience, and stored on a computer memory, such as a floppy disk, or the like. During the presentation, the computer is used to retrieve image information and load it into the computer video memory for display purposes. Thus, the computer functions, in a similar manner as a 35 millimeter slide projector. In this regard, the presenter or user can interact remotely with the computer, by standing in front of an audience and use a wireless remote unit, such as an infrared remote unit, to control the sequencing of the electronic slides. However, whenever the execution of the slide show software must be initiated, or interrupted, the presenter must then go to the computer console to make necessary adjustments. Also, there is no provision for highlighting the visual presentation, or otherwise modifying it in a convenient manner.

Therefore, it would be highly desirable to be able to modify or to highlight the presentation information, without the need of the presenter going to the computer console to enter information for making necessary adjustments. In this regard, it has been difficult, if not impossible for a user to employ a conventional auxiliary input device, such as a mouse, to highlight or accent certain portions of the displayed information by, for example, drawing a circle or a line at or near selected portions of the displayed information to be accented.

Therefore, it would be highly desirable for a user to be able to highlight or accent selected portions of the screen, during the presentation, without using the computer keyboard, and without even going near the computer generating the images being projected onto the large screen. Such modifications or additions to the images being presented should be able to be projected, during any frame of the screen images being projected at the control of the presenter.

Disclosure of Invention

Therefore, it is the principal object of the present invention to provide a new and improved computer input system and method, which permit a user to interact readily with a computer in a more convenient manner.

It is another object of the present invention to provide such a new and improved system and method which enables a user to interact with the computer, while making a presentation to an audience of computer generated information being projected onto a large screen.

Briefly, the above and further objects of the present invention are realized by providing a new and improved computer input system which enables a user to interact more conveniently with a computer generating information.

A computer input system for a computer generating images appearing on a screen. For the purpose of modifying the images appearing on the screen, a light generating device causes an auxiliary light image to appear on the screen. An image sensor responds to the auxiliary image, and a circuit responds to the sensor for causing auxiliary image information to be stored concerning the auxiliary light image. Another circuit responds to the stored auxiliary image information to supply the auxiliary light image information to the computer for utilization therein.

The inventive system enables the user to point at a designated portion of a viewing screen, to cause the designated portion of the viewing area to be acted upon as directed by the presenter. The input pointing system or device includes an actuation switch to control the manner in which the information being entered into the computer, is being controlled. In this regard, any computer action which may be activated using a conventional auxiliary input device such as a graphic tablet, can be emulated by pointing or touching the input pointing device to a selected area of the screen. All normal tablet operations including "point," "click," and "drag," can be emulated using the pointing device to permit a user to highlight or change the displayed information, or to draw on the viewing surface with the light device, without leaving permanent marking indicia on the viewing surface.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein:

FIG. 10A is a diagrammatic illustration of a simulated screen of the image sensor of FIG. 1 showing a simulated detected spot of light covering a series of image sensor scan lines;

FIG. 10B is a greatly enlarged diagrammatic view of the simulated light spot image of FIG. 10A showing pixel coordinates;

FIG. 10C is a diagrammatic representation of the data memory of the microprocessor shown in FIG. 3, and FIG. 11 is a flow diagram of additional software for controlling processing unit of FIG. 5.

BEST MODE FOR CARRYING OUT THE INVENTION

The following description is presented and organized to the following outline:
A. PROJECTION VIEWING SYSTEM DESCRIPTION
B. SYSTEM OPERATION
C. LIGHT GENERATING DEVICE
D. SIGNAL PROCESSING UNIT
E. PROCESSING UNIT SOFTWARE
F. DIRECT VIEWING MONITOR SYSTEM

A. PROJECTION VIEWING SYSTEM DESCRIPTION

Figure 1:
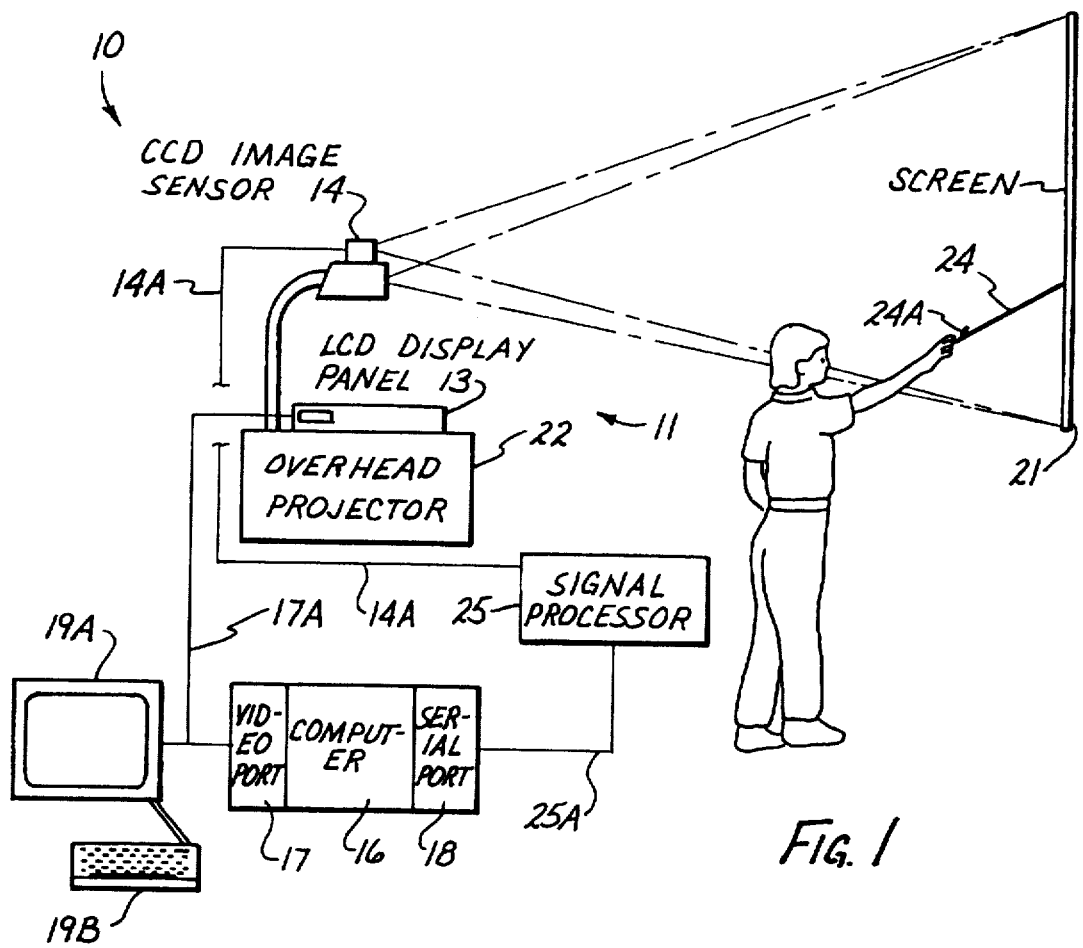
FIG. 1 is a block diagram of a computer input system, which is constructed according to the present invention.
Figure 3:
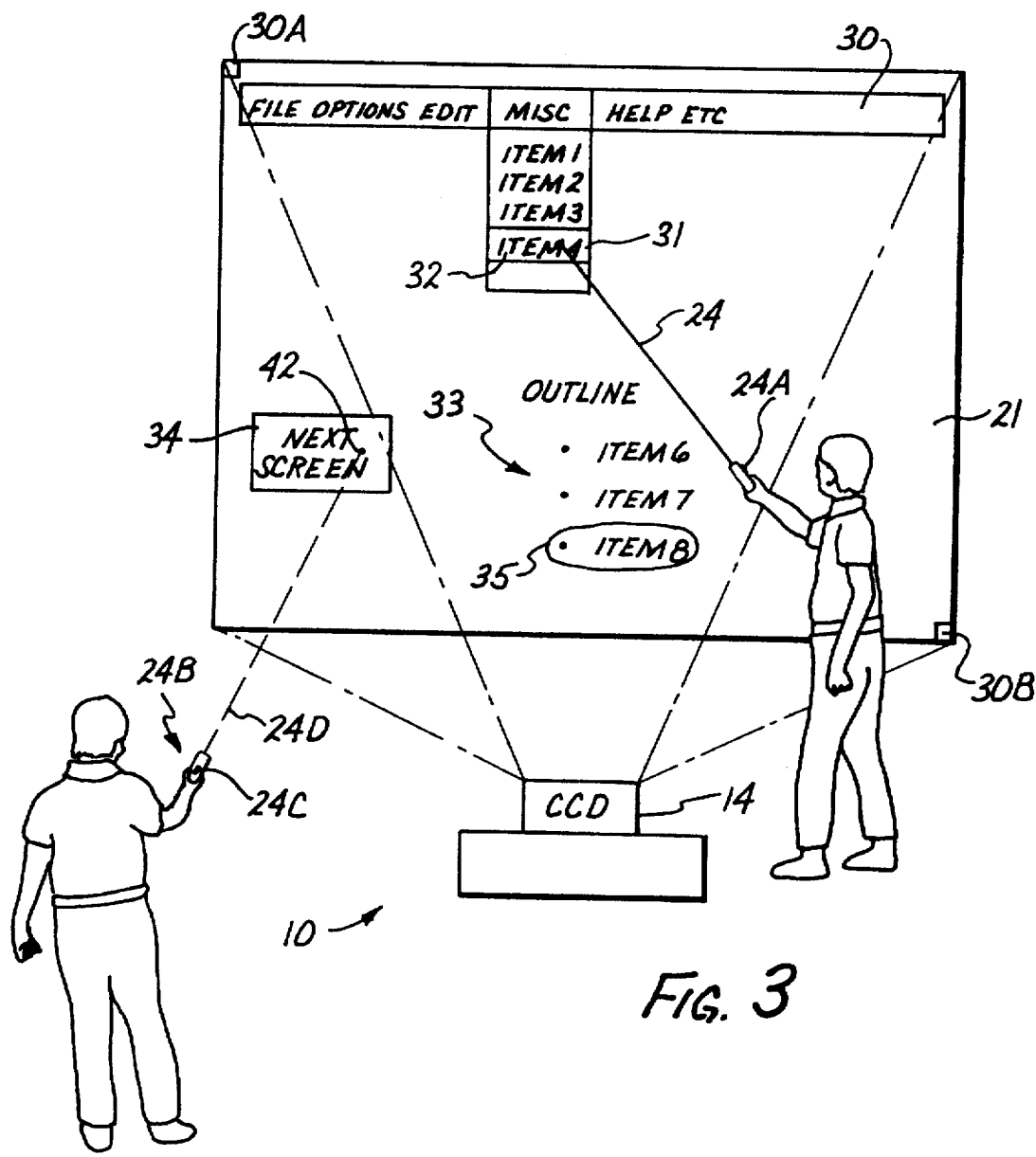
FIG. 3 is a diagrammatic view illustrating different manners of using the system of FIG. 1.

Referring now to the drawings, and more particularly to FIGS. 1 and 3 thereof, there is illustrated a computer input system 10, which modifies computer generated images appearing on a screen 21, and which is constructed in accordance with the present invention.

The computer input system 10 generally includes an image projection/detection system or arrangement 11 whose input path (cable 17A) is coupled to the output of a video port 17 of a computer 16. The arrangement 11 comprises a liquid crystal display panel 13 and a charge coupled device image sensor 14. Computer 16 is a conventional personal computer, such as a model PS/2 personal computer manufactured by International Business Machines. The computer 16 includes a video monitor 19A and a keyboard 19B. The panel 13 driven by the computer 16, generates light images, which are projected by an overhead projector 22 onto the screen 21.

The computer input system 10 also includes a signal processing unit 25 coupled between the output path (cable 14A) of the image projection/detection arrangement 11 and the input serial port 18 of the computer 16 via cable 25A. The computer input system 10 further includes a light wand or light generating pointing device 24, or a laser light generating device 24B (FIG. 3), sold by Navitar under the tradename POCKET LASER. As best seen in FIG. 3, the device 24 generates an auxiliary light image which may be directed by a user to a designated portion or portions of computer generated video image signals displayed on the projection screen or viewing area 21.

The projection/detection arrangement 11 detects the presence of the auxiliary light image or spot projected onto the viewing surface 21 by the hand held, battery-operated light generating device 24, and generates an analog electrical signal which is coupled to the signal processing unit 25 via a cable 14A. The signal processing unit 25 responds to the analog signal, and converts the signal into digital pixel coordinate reference signals which identify the relative position of the auxiliary light image on the screen 21, and which are transmitted to the computer 16 via the output cable 25A. Cable 25A is connected to the serial input port 18 of the computer 16. Computer 16 responds to the pixel coordinate signals, and can alter its application program which causes the computer generated images being projected onto the screen 21. For example, the computer generated projected images on the viewing area 21 can be modified in accordance with the information contained in the coordinate reference signals.

The liquid crystal display panel 13 is preferably a model A480SC manufactured by Computer Accessories Corporation. The liquid crystal display panel 13 converts computer generated information signals into video image signals projected by the conventional overhead projector 22 onto the projection screen or viewing area 21. In this regard, the panel 13 is coupled to the video port 17 of the computer 16 via cable 17A.

The charge coupled device image sensor 14 is preferably a model LC9943 manufactured by Sanyo. The image sensor 14 detects light images projected onto the viewing surface 21 by the light generating device 24, as well as the overhead projector 22. In this regard, the image sensor 14 may be positioned on any suitable support surface, such as on the overhead projector 22, so long as the sensor 14 is positioned to receive the light images projected onto the screen 21 by the light generating device 24 and the overhead projector 22. It should be understood that the sensor 14 may also be incorporated as part of the LCD display panel 13, or mounted on any other convenient supporting surfaces.

B. SYSTEM OPERATION

In operation, after the system 10 has been calibrated, as will be explained hereinafter in greater detail, computer 16 generates a video output signal that is coupled to the liquid crystal display panel 13. The liquid crystal display panel 13 converts the video signal into a visual image which is displayed thereon, and the display image is then projected by the overhead projector 22 onto the screen 21. A user, for example, then touches the tip of the light generating device 24 to any desired portion of the visual display and activates the light generating device 24 by depressing an activation switch 24A.

When switch 24A is depressed, the light generating device 24 produces an auxiliary spot light image on the screen 21 which is superimposed over the visual computer generated image being projected by the overhead projector 22. The image sensor 14 detects the presence of the auxiliary light image generated by device 24 and produces a video signal which is transmitted to the signal processing unit 25 via cable 14A.

The signal processing unit 25 converts the video signal received from the image sensor 14 into a pixel coordinate reference data signal that is transmitted to the personal computer 16 via cable 25A. Computer 16 receives the coordinate reference data signal, converts the signal via conventional software stored therein, into a command signal and generates a modified video signal for changing the displayed information on screen 21, as will be explained hereinafter in greater detail.

Referring now to FIG. 3, three typical ways of using the light generating device 24 with the computer generated display are shown and will be described hereinafter in greater detail. In the descriptions that follow, the light generating device 24 is an elongated wand having switch on its handle portion, and a small incandescent light at its tip portion. In this regard, when the tip portion of the wand or device is touched to the screen the incandescent light illuminates that portion of the screen so that the generated light may be easily and reliably detected by the image sensor 14. A high brightness light emitting diode or any other suitable light source may be used in place of the incandescent light.

It should be understood, however, that other types of light generating devices could be utilized. For example, as shown in FIG. 3, the laser generating device 24B may be used to enable the user to project an auxiliary light image 42 onto the screen at 42, at a distance therefrom.

Referring now to FIG. 3 a popular way of selecting various options or subroutines from a computer program is to position a cursor to a computer generated displayed line of information where the various options or subroutines are displayed for a user's selection. The user then presses an ENTER key on the computer keyboard. Alternately, a mouse device may be used to position an on screen cursor onto the desired selection, which is then activated by clicking the mouse button. The computer having stored the line and character location of the cursor is able to translate the coordinate data of the cursor into an appropriate function code that calls the option or subroutine displayed at that coordinate. This sample type of selection or point operation can be performed with the present inventive system. For example, the user using the light wand 24 touches the viewing screen 21, having a menu bar 30 displayed thereon, on a desired selection within the menu bar 30. As the user points to a menu item from the menu bar 30 he or she activates the momentary push button switch 24A to illuminate a point within the menu 30. The signal processing unit 25 responds to the detected light and generates a pixel coordinate that is transmitted to the computer 16. The computer 16 uses the pixel coordinate signal to call a POINT module stored in computer 16.

In this regard, it should be understood that computer 16 contains a device driver module which is well known to those skilled in the art. The device driver module establishes a bidirectional communication path between the computer 16 and the signal processor 25 so that the output signals produced by the signal processor 25 appear to be conventional graphic tablet signals which the computer 16 utilizes to initiate POINT, CLICK and DRAG subroutines. In this regard, a user of the system 10 loads the computer 16 with the device driver to permit the computer 16 to convert all the data received from the processor unit 25 into standard computer commands for manipulating the video signal produced by computer 16 according to conventional techniques.

When the POINT module is called, the computer 16 automatically highlights the visual image disposed at the detected coordinate to interact with the user by causing the computer generated image at the corresponding screen coordinate location to be highlighted. In this manner, as the user points to each menu item from the menu bar 30, the item is highlighted until the user points to a different item.

Similarly, when the user desires to select a given menu item, the user again presses the button 24A on the light wand 24 to cause a submenu 31 to appear. In this regard, the incandescent light generated by the light wand 24 is detected by the image sensor 14, converted into $(X_1, Y_1)$ coordinates by the signal processing unit 25 and transmitted to the computer 16. The computer 16 receives the pixel coordinate signal to call a CLICK module stored in computer 16. When the CLICK module is called computer 16 translates the $(X_1, Y_1)$ image sensor pixel coordinates into viewing screen coordinate $(X_2, Y_2)$ to determine which submenu selection has been selected by the user. As the user moves the light wave 24 down the list of items in submenu 31 each item in the submenu is highlighted in turn by the process previously described. When a particular item, such as item 32 in submenu 31 is desired, the user again presses button 24A to cause the computer to initiate the correct corresponding action.

As another example, during an electronic slide show, it may be desirable to emphasize a certain area of the view screen 21, such as on image 33 in FIG. 3. In this example, the user emphasizes image 33 by appearing to "draw" a boundary line around the image 33 using the light wand 24. In this case, the user again presses button 24A to cause a DRAG module stored in the computer 16 to be called. When the DRAG module is called, the computer 16 automatically connects each point on the viewing screen 21 that is touched by the user. In this manner a user appears to draw image 35 on the viewing screen 21 with the light wand 24.

As another example, in a conventional personal computer a number of special function keys are provided on the computer keyboard that are used in conjunction with an application program, such as WORD PERFECT, to initiate certain computer operating functions like word processing. For example, by pressing a function key the computer may be programmed to display a new page of computer generated information. Such interactive action can also be achieved with the light wand 24. For example, referring to FIG. 3, an on-screen "button" 34 causes the computer 16 to display, a new page of computer generated information. In this regard, the button image 34 is merged into the other computer generated images displayed at the viewing area under the control of computer 16. A user, using the light generating device 24B, directs the laser light 24D toward the button image 34 and causes a spot of light 42 to be produced inside the button image 34. The user then presses button 24C on the light device 24B. The signal processor 25 sends the pixel coordinates data signal of the light spot 42 to computer 16. Computer 16 translates the coordinates and determines the coordinates correspond to the location where the button image 34 is displayed. The computer 16 thus causes a new page of computer generated information to be projected onto the viewing screen 21.

The foregoing examples are illustrative of normal graphic absolute position operations such as "point," "click" and "drag" in that the signal processing unit 25 generates coded information which the computer 16 utilizes to change the presentation data. Device drivers for using such information to change presentation data is well known in the computer industry.

C. LIGHT GENERATING DEVICE

Figure 4:
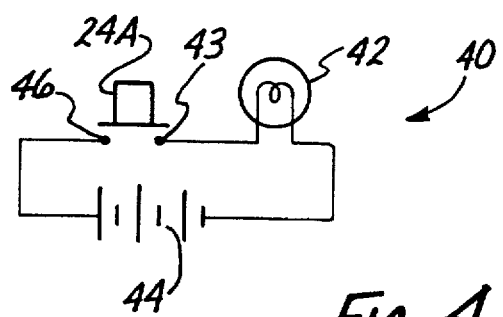
FIG. 4 is a circuit diagram of a light forming device of the system of FIG. 1.

Considering now the light wand or light generating pointing device 24 in greater detail with reference to FIGS. 1, 3 and 4, the light wand 24 includes a lamp actuation circuit 40 that enables a user of the device to turn the light wand 24 on and off in any given sequence. The lamp activation circuit 40 generally includes an incandescent lamp 42 which is connected between a normal open terminal 43 of the actuation switch 24A and a dry cell battery 44. The dry cell battery 44 is connected by its other terminal to a normal open terminal 46 of switch 24A thus completing the circuit 40. In this regard, whenever a user depresses switch 24A the terminals 43 and 46 are connected, allowing current flow to lamp 42.

D. SIGNAL PROCESSING UNIT

Figure 5:
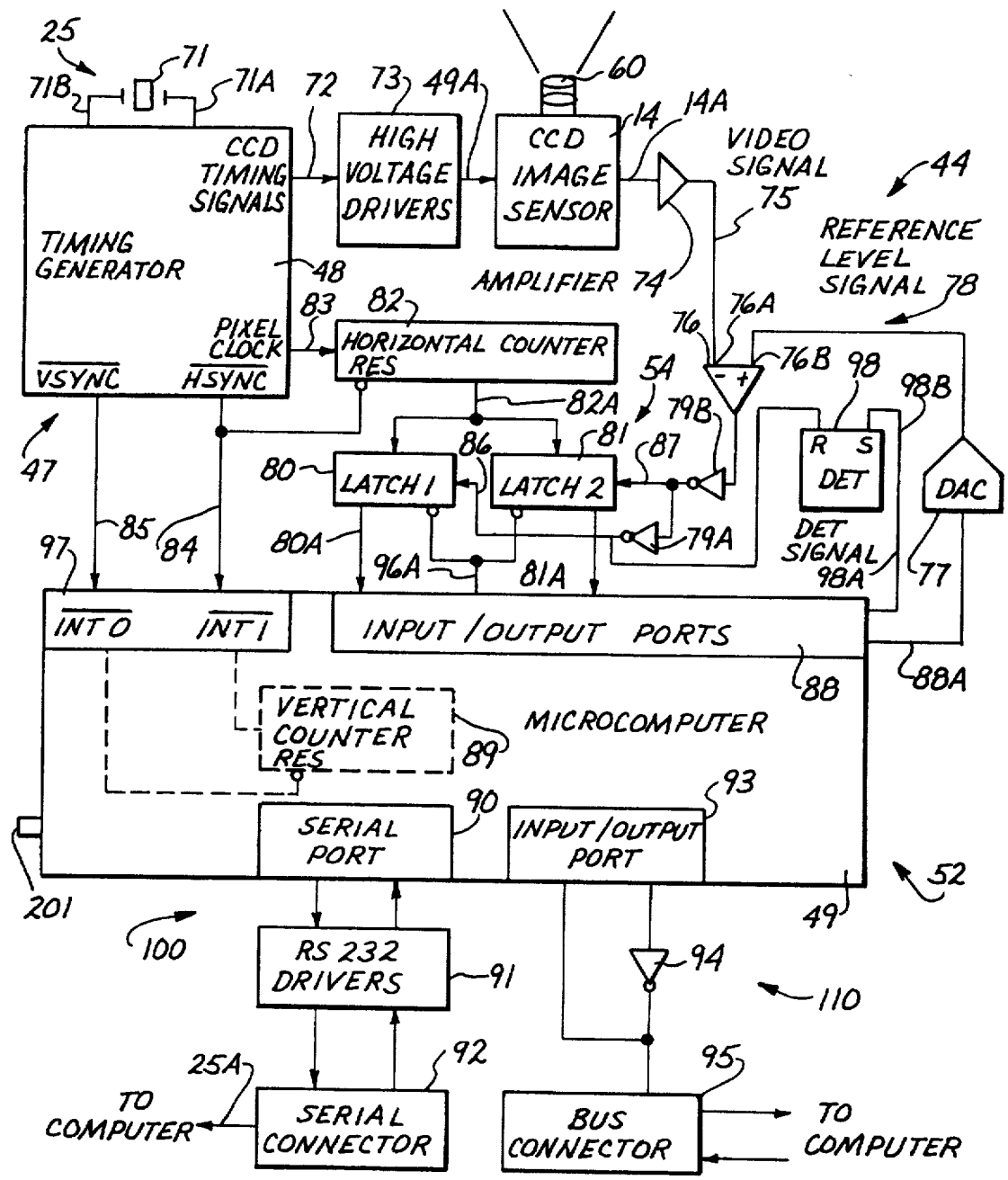
FIG. 5 is a symbolic block diagram of a signal processing unit of the system of FIG. 1.

Considering now the signal processing unit 25, in greater detail with reference to FIGS. 1 and 5, the signal processing unit 25 generally comprises a reference level analog to digital comparator network 44, a synchronizing network 47, and a position detector 52. The signal processing unit 25 develops the timing signals for the image sensor 14 and transmits coordinate reference data signals to the personal computer 16 via cable 25A. The coordinate reference data signals transmitted to the personal computer 16 are synchronized with the video output signals generated by the computer 16. In this regard, the computer 16 contains the software to receive data from the signal processing unit 25 and convert the received data into a command signal. The software determines the type of command signal and then modifies the information stored in the memory of the personal computer 16 to generate a modified video signal for changing the displayed information on the screen 21.

Considering now the synchronizing network 47 in greater detail with reference to FIG. 5, the synchronizing network 47 generally comprises a timing generator 48, such as a Sanyo LC9904A timing generator, a high voltage drive electronic unit 73, and a resonator 71. The synchronizing network 47 is connected between the image sensor 14 via cable 49A and the position detector 52 via a set of conductors 83, 84 and 85, respectively. The synchronizing network 47 develops the timing signals for the image sensor 14 and the synchronizing signals for the position detector 52 as related to the video output signals generated by the computer 16.

Considering now the timing generator 48 in greater detail, the timing generator 48 is a conventional LC9904A timing generator made by Sanyo. The timing generator 48 is driven by the resonator 71 which provides an accurate time base for developing the system's synchronizing and timing signals. The timing signals generated by the timing generator 48 are at conventional "TTL" five volt levels which are supplied to the high voltage drive electronic unit 73 via the conductor 72.

Considering now the resonator 71 in greater detail, the resonator 71 generate a repetitive clocking signal for establishing the timing signals for the charge coupled device image sensor 14 and the synchronizing signals for the position detector 52. Resonator 71 is a conventional crystal resonator well known in the computer industry. Resonator 71 generates a 12.27 MHz output signal that is connected to the timing generator 48 by a pair of conductors 71A and 71B respectively.

Considering now the high voltage drive electronic unit 73 in greater detail with reference to FIG. 5, the drive electronic unit 73 converts the standard "TTL" five volt logic timing signals into high volt timing signals that are required by the image sensor 14. In this regard, the drive electronic unit 73 provides the necessary and proper pulse signals at the proper voltage levels to operate the image sensor 14. In the preferred embodiment of the present invention, the high voltage drive electronic unit 73 is a model LB8904, manufactured by SANYO. The output of the drive electronic unit 73 is connected to the charge coupled device 14 via a conductor 49A.

The timing generator 48 produces three synchronizing signals: a vertical retrace synchronizing signal ("VSYNC") transmitted on conductor 85, a horizontal retrace synchronizing signal ("HSYNC") transmitted on conductor 84; and a pixel clock signal ("CLOCK") transmitted on conductor 83. The pixel clock signal on conductor 83 makes a transition once per scanned picture element ("pixel") in the charge couple device 14 and is utilized by the position detector 52 for developing an output signal indicative of a given pixel location in a horizontal line of the displayed information on the screen 21. The horizontal and vertical retrace synchronizing signals on conductors 84 and 85 are utilized by the position detector 52 for establishing reference coordinate locations for light waves detected by the image sensor 14 relative to the screen 21.

Considering now the reference level analog to digital comparator network 44 in greater detail with reference to FIG. 5, the comparator network 44 generally comprises a video amplifier 74, an analog comparator 76 and a digital to analog converter 77. The comparator 44 generates a digital output signal whenever the image sensor 14 generates a video signal 75 indicative that the charge coupled device 14 has detected light produced by the light generating device 24 and/or the overhead projector 22.

Considering now the video amplifier 74 in greater detail with reference to FIG. 5, the video amplifier 74 is connected to the output of the charge couple device 14 via conductor 14A. The video amplifier 74 is a conventional emitter follower well known to those skilled in the art. Although amplifier 74 is shown in the preferred embodiment as forming part of the comparator network 44, it should be understood that amplifier 74 could be included in the electronic circuits (not shown) of the charge couple device 14. The amplifier 74 generates analog video output signal 75 whenever the charge couple device 14 detects light.

Considering now the analog comparator 76 in greater detail with reference to FIG. 5, the comparator 76 generates a digital output signal whenever the analog video output signal 75 from the video amplifier 74 exceeds a predetermined reference level voltage signal 78 as will be described hereinafter in greater detail. Comparator 76 is a conventional model LM319A comparator and has a negative input terminal 76A and a positive input terminal 76B. Terminal 76A is connected to the video output signal 75 generated by the video amplifier 74. Terminal 76B is connected to the predetermined reference level voltage signal 78. In this regard, whenever a video output signal 75 is generated by amplifier 74, the comparator 76 determines whether the voltage level of the detected signal 75 exceeds the reference level voltage signal 78. If the detected signal 75 exceeds the reference level signal 78, the comparator 76 generates a digital output signal at its output that is indicative of the presence of light generated by the light generating device 24 (or the overhead projector 22 if the reference level voltage is set sufficiently low). In this regard, when the presence of light is detected by the image sensor 14, a digital pulse appears at the output of the comparator 76 in each of the horizontal lines of the displayed information for which the light spot is detected.

Considering now the digital to analog converter 77 in greater detail with reference to FIG. 5, the digital to analog converter 77 converts a reference level digital signal 88A into the reference level voltage signal 78. The digital to analog converter 27 is a conventional AD557 eight bit converter manufactured by Analog Devices, Inc. The output of the digital to analog converter 77 is connected to the positive terminal 76B, of comparator 76 via a conductor 78. The input to the digital to analog converter 77 is connected to a signal input/output port 88 of a microprocessor 49.

Considering now the position detector 52 in greater detail with reference to FIG. 5, the position detector 52 generally comprising a horizontal counter latching network 54 and the microprocessor 49. The position detector 52 converts the detected video signals from image sensor 14 into coordinate reference data signals for transmission to the computer 16.

Considering now the microprocessor 49 in greater detail with reference to FIG. 5, the micro-processor 49 converts the image sensor video output signal 75 captured by the horizontal counter latching network 54 into a conventional computer input command and sends the converted data signals to the personal computer 16 as will be described hereinafter in greater detail.

Microprocessor 49 is a conventional 8051 microprocessor that includes various interfaces to computer 16 for the purpose of emulating conventional interface devices, such as for example, a graphic tablet. In this regard, microprocessor 49 includes a serial interface arrangement 100 including a serial port 90 and a standard RS-232 driver 91 and connector 92 for serial data transmission, and a computer interface arrangement 110 including a two bit input/output port 93, an open collector buffer 94 and an interface connector 95 for data transmissions to a computer.

Microprocessor 49 also includes an interrupt port 97, the input/output port 88, and firmware for developing an output signal that is indicative of a conventional interface device output signal for modifying displayed computer generated information. The input/output port 88 is connected to the horizontal counter latching network 54 via conductors 80A, 81A, 88A and 96A. The interrupt port 97 is connected to the timing generator 48 via conductors 84 and 85. Microprocessor 49 includes internal registers, memory, interrupts and other circuits that are conventional and well known to those skilled in the art. Reference may be made to the Intel 8051 Microcontrol Users Manual for additional details. It should be understood however that microprocessor 49 generates the following flags and interrupt signals as will be described hereinafter in greater detail: VFLAG, SATFLAG, CALFLAG, and interrupts INTI and INTO.

Considering now the horizontal counter latching network 54 in greater detail with reference to FIG. 5, the horizontal counter latching network 54 generally comprises a horizontal counter 82, a begin pulse latch 80, an end pulse latch 81 and an invertor 79. The horizontal counter latching network 54 develops a coordinate reference data signal indicative of a pixel location in a given horizontal line of displayed information.

Considering now the horizontal counter 82 in greater detail with reference to FIG. 5, the horizontal counter 82 is a conventional 8 bit counter; such as a model 74HC393. The horizontal counter 82 is incremented once for each transmission of the pixel clock signal on conductor 83 and reset whenever the timing generator 48 produces the horizontal retrace synchronizing signal (HSYNC) on conductor 84. The output of the horizontal counter is connected to both the begin pulse latch 80 and the end pulse latch 81 via a conductor 82A.

Considering now latches 80 and 81 in greater detail with reference to FIG. 5, latches 80 and 81 store the count value from the horizontal counter 82 when clocked by latch signals 86 and 87 respectively. Latches 80 and 81 are conventional leading edge latching devices, such as model number 74HC374 devices. Latch signals 86 and 87 are derived from the digital output signal from comparator 76 via a pair of inverters 79A and 79B. Inverters 79A and 79B are contained in a model 74HC14 device. Comparator 76 compares the instantaneous analog video output signal 75 from the charge coupled device image sensor 14 and the direct current voltage level reference 78 provided by the microprocessor 49 via the digital to analog converter 77. In this regard, whenever the charge couple device image sensor 14 detects a source of light that is of sufficient intensity that permits the video output signal 75 to exceed the reference level voltage signal 78, a digital pulse appears at the output of comparator 76. This pulse will appear for each horizontal line in the computer generated display on screen 21 in which the light is detected. It should be understood that the light generated by the light generating device 24 may be projected on screen 21 in such a manner that more than one horizontal line of the computer generated display on screen 21 will be superimposed with such light.

The leading edge of the pulse latch signal 86 (via inverter 79A) triggers the begin pulse latch 80 so that latch 80 is set with the current binary count value in the horizontal counter 82. When the light is no longer detected by the image sensor the pulse terminates. In this regard, the end or trailing edge of the latch pulse signal 86 is inverted by inverter 79, to produce the positive leading edge latch signal 87 at its output. As both latches 80 and 81 are conventional leading edge latching devices, leading edge of signal 87 triggers latch 81 so that the then current count in the horizontal counter 82 is stored in latch 81. Latch 80 thus holds a pixel count which represents the beginning of the detected light pulse detected by comparator 76, while latch 81 holds a pixel count which represents the end of the detected light pulse detected by comparator 76.

As will be explained hereinafter in greater detail, microprocessor 49 examines the contents of latches 80 and 81 each time the timing generator 48 produces a horizontal retrace synchronizing signal on conductor 84 to determine the horizontal coordinate of any light detected by the image sensor 14. In this regard, the values stored in latches 80 and 81 are used by the microprocessor 49 to determine the coordinate location of the light projected on screen 21 by the light generating device 24. Once the microprocessor 49 has determined the coordinate location it resets the latches 80 and 81, respectively.

In order to permit the microprocessor 49 to determine the horizontal coordinate location, the output signals of latches 80 and 81 are connected to the input/output port 88 of microprocessor 49 via conductors 80A and 81A respectively. In order to permit microprocessor 49 to reset latches 80 and 81, the reset input terminals of each respective latch is also connected to the input/output port 88 of microprocessor 49 via conductor 96A.

Flipflop 98 is set whenever a light pulse signal is generated by comparator 76. The "DETECT" signal 98A from flipflop 98 is connected to an input port pin of microprocessor 49. This DETECT signal 98A serves to indicate that a light pulse has been detected by comparator 76 so that microcomputer 49 can read the states of latches 80 and 81 to determine the horizontal coordinates of the light spot. Flipflop 98 is reset by a signal from the microcomputer 49 on output pin 98B connected to the reset terminal.

In operation, microprocessor 49 is interrupted by the timing generator 48 at the end of each horizontal line. In this regard, whenever the timing generator 48 produces the horizontal retrace synchronizing signal (HSYNC) on conductor 84 the microprocessor 49 checks the state of the DETECT signal 98A, and if high reads the contents of latches 80 and 81 and then resets latches 80 and 81 an detect flipflop 98. In this way, the horizontal position of the light produced by the light generating device 24 is recorded by the microprocessor 49.

Microprocessor 49 also records the vertical position of the detected light. In this regard, microprocessor 49 includes a software implemented internal vertical counter 89 that is incremented each time the timing generator 48 produces the horizontal retrace synchronizing signal (HSYNC) on conductor 84. The software implemented vertical counter 89 is reset whenever the timing generator 48 produces the vertical retrace synchronizing signal (VSYNC) on conductor 85. The software-implemented vertical counter 89, thus, indicates the instantaneous vertical position of the detected light. Although a software implemented vertical counter is used in the preferred embodiment of the present invention, it should be understood that a hardware vertical counter, similar to the horizontal counter 82, could be provided in the position detector 52 to accomplish the same purpose.

Figure 6:
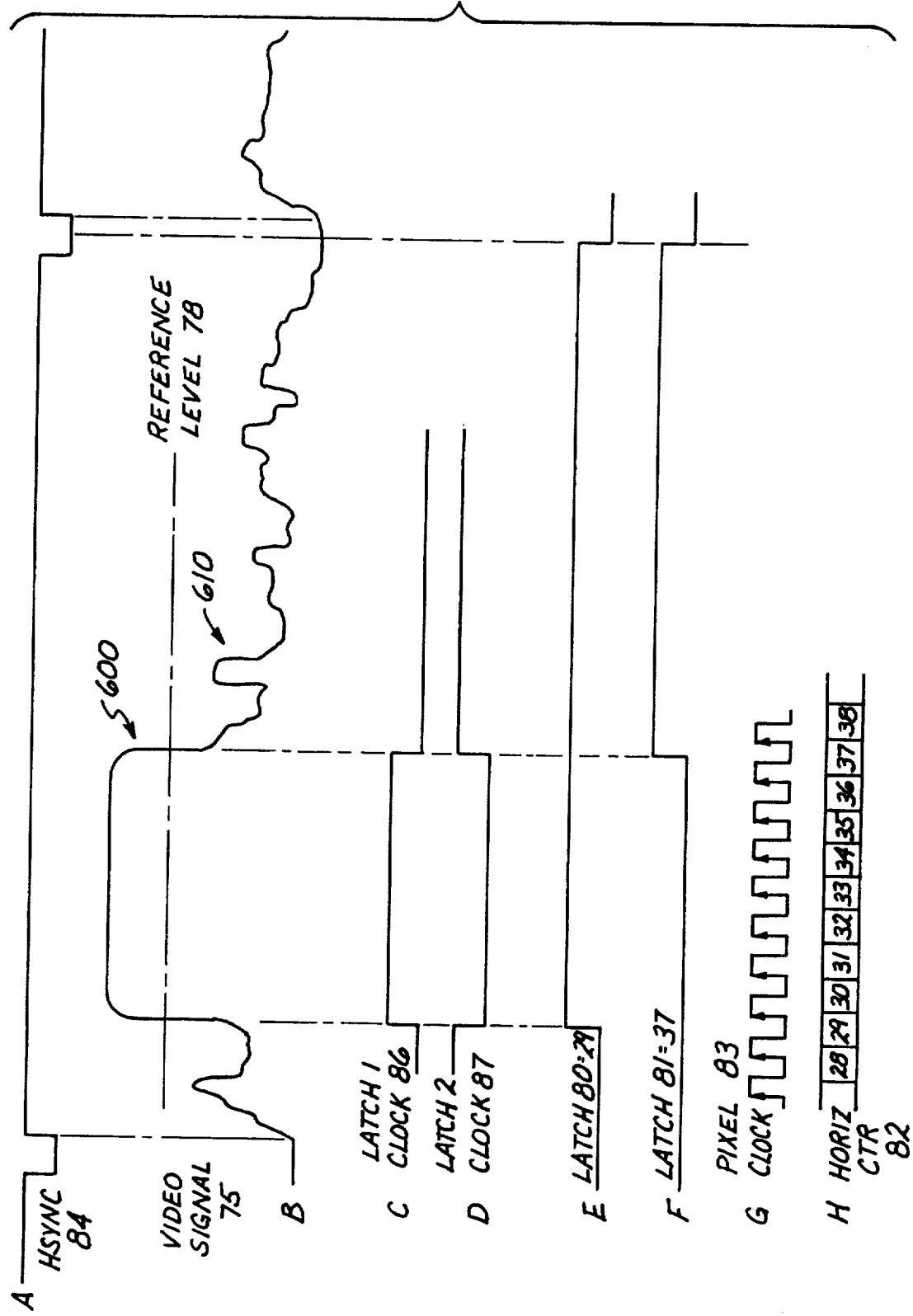
FIG. 6 are signal timing diagrams helpful in the understanding of the processing unit of FIG. 5.

Referring now to FIG. 6, an illustrative example of the signal processing sequence in the signal processing unit 25 is provided. Line A in FIG. A is a representation of the horizontal retrace synchronizing signal (HSYNC) on conductor 84. This signal occurs at the end of each horizontal line scanned by the CCD image sensor 14. Line B of FIG. 6 is an illustration of a representative video output signal 75 from amplifier 74 when the charge couple device image sensor 14 is focused on an area of the screen 21 and the light generating device 24 causes a bright spot of light to appear on screen 21. In this regard, an analog level 600 is generated that is higher in amplitude than the surrounding light signal 610 which is also detected by the image sensor device 14. As indicated in line B the reference level voltage signal 78 has been set by the microprocessor 49 to detect the light pulse signal 600 and not the background illumination or the computer generated displayed information as indicated by signal 60.

Line G in FIG. 6 is illustrative of the pixel clock signal on conductor 83 which is pulsed for each pixel location in every horizontal line of computer generated displayed information.

Line H in FIG. 6 is illustrative of the horizontal counter 82 being incremented on the transition of each pixel clock on conductor 83 and showing diagrammatically the binary number stored in the counter, running from 28 to 38.

The latch clocks signals 86 and 87 shown in line C and D respectively cause two counts to be captured by latches 80 and 81 respectively. In this illustrative example, latch signal 86 causes the count 29 to be stored in latch 80 while latch signal 87 causes the count 37 to be stored in latch 81. Latches 80 and 81 thus hold counts indicative of the horizontal position and width of the light detected by the image sensor 14.

The microprocessor 49 upon receiving the horizontal pixel coordinate signals from latches 80 and 81 respectively converts this coordinate data as well as the internal software vertical coordinate signal data from vertical counter 89 into a conventional computer input device command or emulated command. In this regard, the microprocessor 49 also sends button information to computer 16 within the emulated commands as will be explained hereinafter in greater detail. A subroutine DETECT HSYNC module 800 enables the microprocessor 49 to detect an interruption in the user generated light using one or more predetermined on-off sequences, so as to detect the action of pressing the control button 24A on the light generating device 24.

Once the microprocessor 49 has converted the image coordinate signals ($X_1$, $Y_1$) to a computer input device command, the microprocessor 49 sends the commands along with any button information through serial port 90 to computer 16 via the RS-232 drivers 91 and serial connector 92. In this regard, it should be understood that cable 25A is connected between the serial port 18 and the serial connector 92. Computer 16 upon receipt of the command then takes appropriate action as previously described depending on the type of emulated command. It should be understood that the software within computer 16 is standard and conventional and will not be described herein.

Considering now the adjusting of the sensitivity level of the comparator 76 in greater detail with reference to FIGS. 5 and 6, the digital to analog converter 77 has its input connected to the microprocessor 49 via connector 88A. In this regard, the microprocessor 49 during the execution of a EXECUTE module 100 establishes a sensitivity level for the system 10 by supplying an appropriate digital code to the digital to analog converter 77 via connector 88A. The digital to analog converter 77 translates the digital code received from the microprocessor 49 into an appropriate reference level voltage 78 that is coupled to the positive input of comparator 76 via connector 77A. By controlling the reference level voltage 78, the microprocessor 49 can adjust different threshold values for comparator 76 as illustrated by the reference level voltage 78 in line B of FIG. 6.

E. PROCESSING UNIT SOFTWARE

The microprocessor 49 includes a software module 200 called CALIBRATE which is used to calibrate the coordinate system ($X_1$, $Y_1$) of the image sensor 14 with the coordinate system ($X_2$, $Y_2$) of the viewing screen 21. The CALIBRATE module 200 is initially called automatically when the system 10 is initialized. It may also be invoked by a manual control. The CALIBRATE module 200 will be described hereinafter in greater detail.

Figure 7:
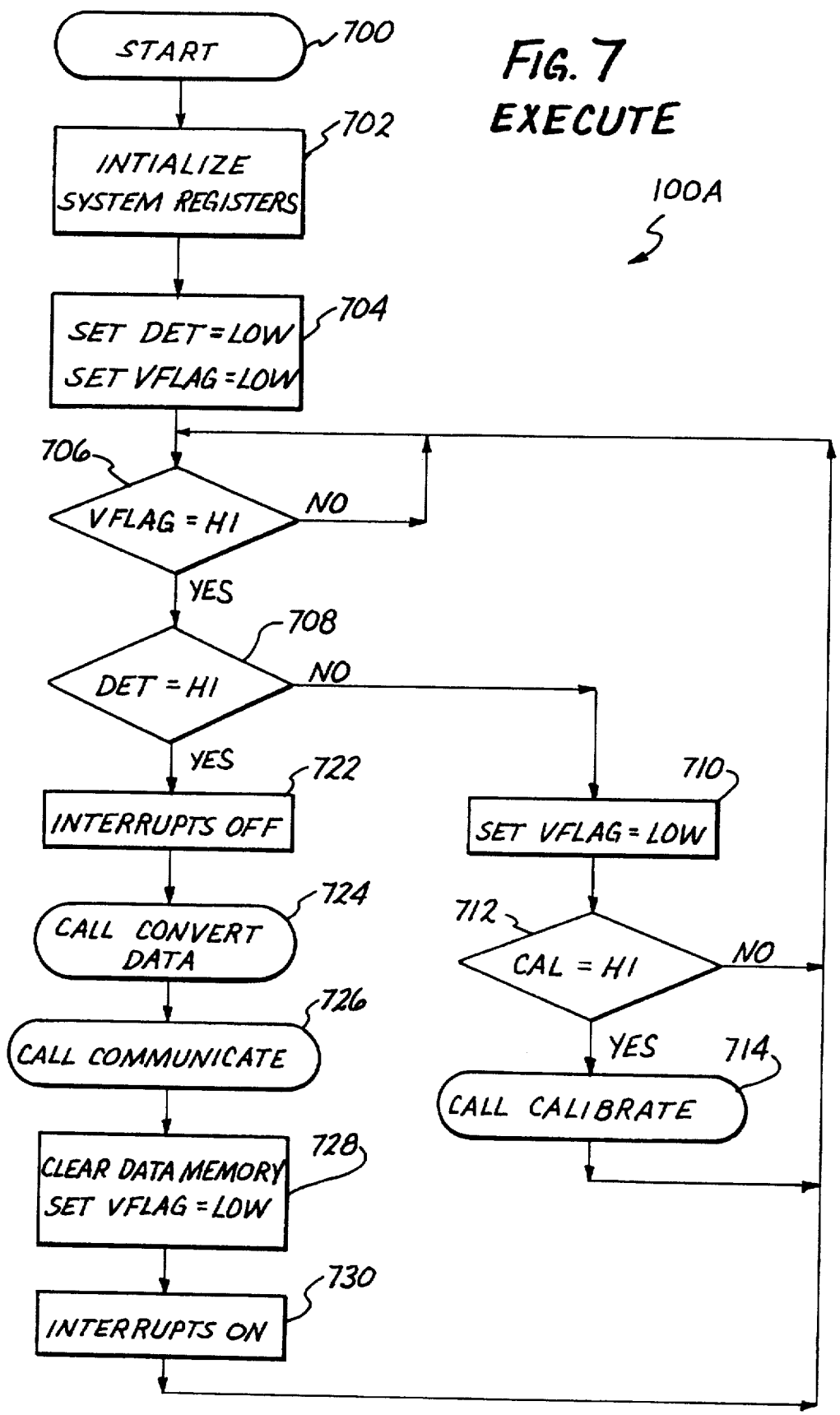
FIGS. 7–9 are flowchart diagrams of software used to control the signal processing unit of FIG. 5.

In FIG. 7, a simplified flowchart of the EXECUTE routine 100A is shown. FIG. 7 illustrates the steps taken by the signal processing unit 25 of FIG. 1 in determining whether the system 10 is operating properly and has been calibrated for interactive use. Included in FIG. 7 are separate subroutines, any one of which is called in response to a change in state of an associated parameter as will be described herein in greater detail. Flow charts illustrating the steps executed by the signal processor 25 of FIG. 1 for each separate subroutines illustrated in FIGS. 8 and 9.

Referring now to the flowchart of FIG. 7, the EXECUTE routine 100A begins at 700 proceeds to an instruction 702 which cause the internal control registers of microprocessor 49 to be initialized. After the microprocessor 49 has been initialized the program proceeds to instruction 704 and initializes (clears) the vertical retrace synchronizing flag ("VFLAG") so the microprocessor 49 will be able to synchronize its operations during the occurrence of each vertical blanking interval. The program then proceeds to decision instruction 706 in which a determination is made whether a VSYNC signal has been generated by the timing generator 48 and set the synchronizing flag ("VFLAG") to a logical high. If the synchronizing flag ("VFLAG") is not a logical high, the program loops on decision instruction 706 until the synchronizing flag ("VFLAG") is set to a logical high. In this regard, when the synchronizing flag ("VFLAG") is set to a logical high the signal processor 25 is synchronized to the vertical blanking interval; thus, assuring that detection results are examined only after a complete field scan of the charge coupled device image sensor 14 has occurred and before a new field scan of the charge coupled device 14 has been initiated.

If it is determined in the decision instruction 706 that the synchronizing flag ("VFLAG") has been set to a logical high (VFLAG=1), the program next executes decision instruction 708 that determines whether light generated by the light wand 24 has been detected by the position detector 52. Since the signal processor 25 has not been calibrated nor adjusted for room lighting conditions, the comparator 76 will be unable to generate an output signal indicative of the detection of light. Accordingly, latches 80 and 81 will not contain a valid pixel position count.

When the program executes the decision instruction 708 it determines whether there has been a change in a variable DET (since the last HSYNC signal) has occurred. The variable DET is utilized to monitor whether light has been detected by the signal processing unit 25. A true or positive logic signal indicates that light has been detected, while a false or negative logic signal indicates otherwise. The manner in which the variable DET is set and reset will be described hereinafter with reference to a DETECT HSYNC subroutine module 800.

If light has not been detected (DET=0) the program advances to command instruction 710 which causes the synchronization flag ("VFLAG") to be cleared. After the synchronization flag has been cleared the program proceeds to decision instruction 712.

At decision instruction 712 the program determines whether the light detecting system 10 needs to be calibrated by determining whether a flag CAL has been set. The flag CAL is utilized to monitor whether the signal processing unit 25 needs to be calibrated. A true or logical high signal indicates that calibration is required while a false or logical low signal indicates otherwise. In the preferred embodiment whenever an internal counter within the microprocessor 49 reaches a predetermined count, the variable CAL will go to a positive logic level. It should be understood that other means for causing the variable CAL to go to a positive level can be utilized such as a timer reaching a predetermined time interval (for example every ten minutes or by depressing a manual push button closure 200 on the signal processing unit 25. If the program determines the signal processing unit 25 needs to be calibrated (CALFLAG set) the program proceeds to instruction 714 and calls the CALIBRATE subroutine module 200 which will be described hereinafter in greater detail. If the program determines that the signal processing unit 25 does not need to be calibrated (CALFLAG not set) the program returns to decision instruction 706 and proceeds as previously described.

Considering again decision instruction 708 in FIG. 7, if the program determines that variable DET has been set the program proceeds to command instruction 722 which causes the signal processing unit interrupts to be turned off. In this regard, it should be understood that it is necessary to turn off the interrupts because a COMMUNICATE subroutine module 400 which sends the serial data to computer 16 could potentially take longer to send such data (depending on the baud rate) than the vertical blanking interval ("VBLANK"). By keeping the interrupts off the program insures that no other data will be sent to the computer 16 which might otherwise be destroyed by new data being received during such transmissions.

After the program has turned off the interrupts in instruction 722 the program advances to instruction 724 which causes the data stored in latches 80 and 81 to be transferred to microprocessor 49. Microprocessor 49 via a CONVERT subroutine module 500, converts the charge couple device coordinate ($X_1Y_1$) derived from latches 80 and 81 and the internal vertical counter 89 into screen coordinates ($X_2Y_2$). The CONVERT subroutine module 500 also formats the converted data into serial data that emulates data from a graphics tablet.

After the data has been converted and formatted the program advances to command instruction 726 which calls the COMMUNICATE subroutine module 400 that sends the formatted data to computer 16.

It should be understood that the COMMUNICATE subroutine module 400 includes programming steps that are well known to those skilled in the art. Accordingly, the COMMUNICATE subroutine module 400 will not be described hereinafter in detail. Table I however, provides a detailed listing of various subroutines utilized by the signal processing unit 25.

TABLE I

```
                    $paginate pagewidth = 120 title(cycl.asm) date
                    $noln
                    ;
                    ; Temporary equates for the Nohau 8051 pod..
                    ;
= 00E8              p0 teq $E8
= 00F8              p2 teq $F8
= 00A9              IP teq $A9
= 0098              rx_flag equ scon.0
= 0099              tx_flag equ scon.1
                    ;
                    ;------------------
                    ;Control Registers
                    ;------------------
                    ; TMOD:
                    ; b7 t1 gate 0                ; enable counter 1
                    ; b6 t1 c/t 0                 ; timer, clock by osc/12
                    ; b5 t1 m1 1                  ; timer1 in mode 2
                    ; b4 t1 m0 0                  ; (autoload baud rate generator)
                    ; b3 t0 gate 0                ; OptiView-pulse width meas. mode
                    ; b2 t0 c/t 0                 ; timer, clock by osc/12
                    ; b1 t0 m1 1                  ; timer0 in mode 2
                    ; b0 t0 m0 0                  ; (8-bit auto reload)
                    ;
= 0022              tmodval equ 00100010b
                    ;
                    ; TCON:
                    ; b7 TF1 0                    ; interrupt flag
                    ; b6 TR1 1                    ; enable counter 1
                    ; b5 TF0 0                    ; interrupt flag
                    ; b4 TR0 1                    ; enable counter 0
                    ; IE1 1                       ; Interrupt 1 enable
                    ; IT1 1                       ; level/transition
                    ; IE0 1                       ; Interrupt 0 enable
                    ; IT0 1                       ; level/transition
                    ;
= 005F              tconval equ 01011111b
                    ;
                    ; PCON:
                    ; b7 smod 0                   ; don't divide baud rate by 2
                    ; b6 x 0
                    ; b5 x 0
                    ; b4 x 0
                    ; b3 GF1 0                    ; general purpose flag
                    ; b2 GF0 0                    ; another one
                    ; b1 PwrDn 0                  ; don't power down
                    ; b0 Idle 0                   ; don't idle
                    ;
= 0000              pconval equ 00000000b
                    ;
                    ; SCON:
                    ; b7 sm0 0                    ; serial mode 1
                    ; b6 sm1 1                    ; (8-bit data, var baud rate)
                    ; b5 sm2 0                    ; not multiprocessor mode
                    ; b4 REn 1                    ; enable receiver
                    ; b3 TE8 0                    ; extra uart bit
                    ; b2 RE8 0                    ; extra uart bit
                    ; b1 ti 0                     ; transmitter interrupt
                    ; b0 ri 0                     ; receiver interrupt
                    ;
= 0050              sconval equ 01010000b
                    ;
                    ;
                    defseg cyclops, absolute
                    seg cyclops
= 0000              org 0
                    ;
                    ; Ram locations
                    ;
= 0000              vflag equ $20.0
= 0040              vcount equ $40
= 0041              lodot equ $41
= 0042              hidot equ $42
                    ;
                    ;--------------
                    ; RESET vector
                    ;--------------
0000 02 0030        loc0 jmp start
                    ;--------------
```

TABLE I-continued

```
                ; Interrupt vectors
                ;---------------
                ;
= 0003          org $03
0003 32         reti                            ; INTO: ADB = 000B          org $08
000B 32         reti                            ; Timer/Counter TF0
= 0013          org $13
0013 02 009A    jmp hsync_int                   ; INT1: hsync/

= 001B          org $18
001B 32         reti                            ; Timer/Counter TF1

= 0023          org $23
0023 32         reti                            ; UART (R1 & TI)
                ;
                ;************************
                ; *** Start of Program ***
                ;************************
= 0030          org $30
                ;
0030 75 89 22   start mov tmod,#tmodval
0033 75 88 5F   mov tcon,#tconval
0036 75 87 00   mov pcon,#pconval
0039 75 98 50   mov scon,#sconval
003C 75 8D E8   mov th1,#$e8                    ; 1200 baud divisor
003F D2 99      setb tx_flag                    ; force "tx ready"

; Note: UART is now ready to send

; Enable interrupts
                ;
0041 D2 AA      setb ex1                        ; enable INT1/
0043 D2 BA      setb IT1                        ; fatting edge triggered ; TF1 (timer 0, Interrupt TF1)
                ;
0045 D2 8E      setb TR1                        ; start the timer
0047 D2 AB      setb ETI                        ; enable timer1 int 0049 D2 AF      setb EA                         ; interrupts ON 0048 75 40 00   mov vcount,#0
004E 75 41 00   mov lodot,#0
0051 75 42 00   mov hidot,#0

0054 12 00BB    call clrdata                    ; clear ram & init pointer r0

0057 75 90 F0   mov p1,#240                     ; DAC at about 2.4 volts
005A C2 85      ctr p3.5
005C D2 85      setb p3.5                       ; strobe DAC
005E 75 90 FF   mov p1,#$ff                     ; float p1
0061 C2 87      stb cir p3.7
0063 D2 87      setb p3.7                       ; clear FF ; **** MAIN PROGRAM LOOP ****
                ;
0065 30 00 FD   loop jnb vflag,loop             ; not in vsync yet
0068 B8 30 0A   cjne r0,#$30,process            ; got some values
0068 C2 00      ctr vflag                       ; clear vsync flag
006D D2 E8      setb p0.0                       ; lite off
006F D2 FF      setb p2.7                       ; beeper off
0071 C2 FD      cir p2.5                        ; aux LO
0073 80 F0      sjmp loop                       ; nothing yet--go again ; Got some data (Vsync flag = 0 AND data pointer has been moved)

0075 C2 AF      process ctr EA                  ; turn off interrupts

; NOTE: keep interrupts off during serial sending
                ; process so the values sent are not wiped out by
                ; the background interrupt program 0077 00         break nop                       ; lookie here
0078 C2 E8      cir p0.0                        ; lite on
007A C2 FF      cir p2.7                        ; beeper on
007C D2 FD      setb p2.5                       ; aux HI
007E E4         car a
```

TABLE I-continued

```
007F 12 00C7    call serial_out          ; send sync byte
0082 E5 33      mov a,$33
0084 12 00C7    call serial_out          ; send vert. coordinate
0087 E5 34      mov a,$34
0089 12 00C7    call serial_out          ; send horiz. coordinate
                ;
                ; Exit: clear data ram, reset data pointer,
                ; clear vflag, enable interrupt.
                ;
008C 12 0088    call clrdata             ; clear data RAM
008F 78 30      mov r0,#$30              ; reset pointer
0091 C2 00      clr vflag                ; reset vsync flag
                ;
                ; Wait for vsync to resynchronize
                ;
0093 30 EF FD   wvs jnb p0.7,wvs         ; jmp if vsync LO
0096 D2 AF      setb EA                  ; int's back on
0098 80 CB      jmp loop
                ;
                ;
                ;------------------------
                ; HSYNC interrupt routine
                ;------------------------
                hsync_int
                ;
009A 20 EF 18   jb p0.7,vsync            ; we're in VSYNC
009D 05 40      inc vcount               ; bump vertical counter
009F 20 B4 01   jb p3.4,fLag             ; check flipflop
00A2 32         reti                     ; no pulse: nothing to do
00A3 A6 40      flag mov @r0,vcount      ; store vert position
00A5 08         inc r0                   ; bump pointer
00A6 C2 B7      clr p3.7                 ; enable latch 1
00A8 A6 90      mov @r0,p1               ; get latched counter value
00AA D2 B7      setb p3.7                ; disable latch 1 & reset flipflop
00AC 08         inc r0                   ; bump pointer
00AD C2 B6      clr p3.6                 ; enable Latch 2
00AF A6 90      mov @r0,p1               ; get count
00B1 D2 B6      setb p3.6                ; disable latch 2
0063 08         inc r0                   ; bump pointer
0084 32         reti
                ;
00B5 75 40 00   vsync mov vcount,#0      ; Vcounter
00B8 D2 00      setb vflag               flag = 1: in vsync interval
00BA 32         reti
                ;
                ;=========================
                ; Subroutines
                ;=========================
                ;
                ;------------------------
                ; Clear RAM data area
                ;------------------------
00BB 78 30      clrdata mov r0,#$30      ; reset pointer
00BD 7A 20      mov r2,#$20              ; loop counter
00BF 76 00      cdloop mov ar0,#0
00C1 08         inc r0
00C2 DA FB      djnz r2,cdloop
00C4 78 30      mov r0,#$30
00C6 22         ret
                ;
                ;------------------------
                ; Send char in A to the UART
                ;------------------------
                serial_out
00C7 30 99 FD   sol jnb tx_flag,sol      ; 0 if not ready
00CA C2 99      clr tx_flag              ; it's ready-clear flag
00CC F5 99      mov sbuf,a               ; send data
00CE 22         ret
                ;
                end
```

After the data has been sent to computer 16 via the COMMUNICATE subroutine 400, the program returns to command instruction 728 which causes the data memory in microprocessor 49 to be cleared. Also at instruction 728 the program resets the synchronizing flag ("VFLAG") to a logic low signal (VFLAG=0) to prevent the same data from again being analyzed and sent to computer 16 during the same VSYNC time interval.

After the synchronizing flag ("VFLAG") has been cleared, the program advances to command instruction 730 which turns the interrupts back on so that another process as just described can be repeated. In this regard, the program loops back to decision instruction 706 to wait for the synchronizing flag ("VFLAG") to be set to a true value (VFLAG=1).

Figure 8:
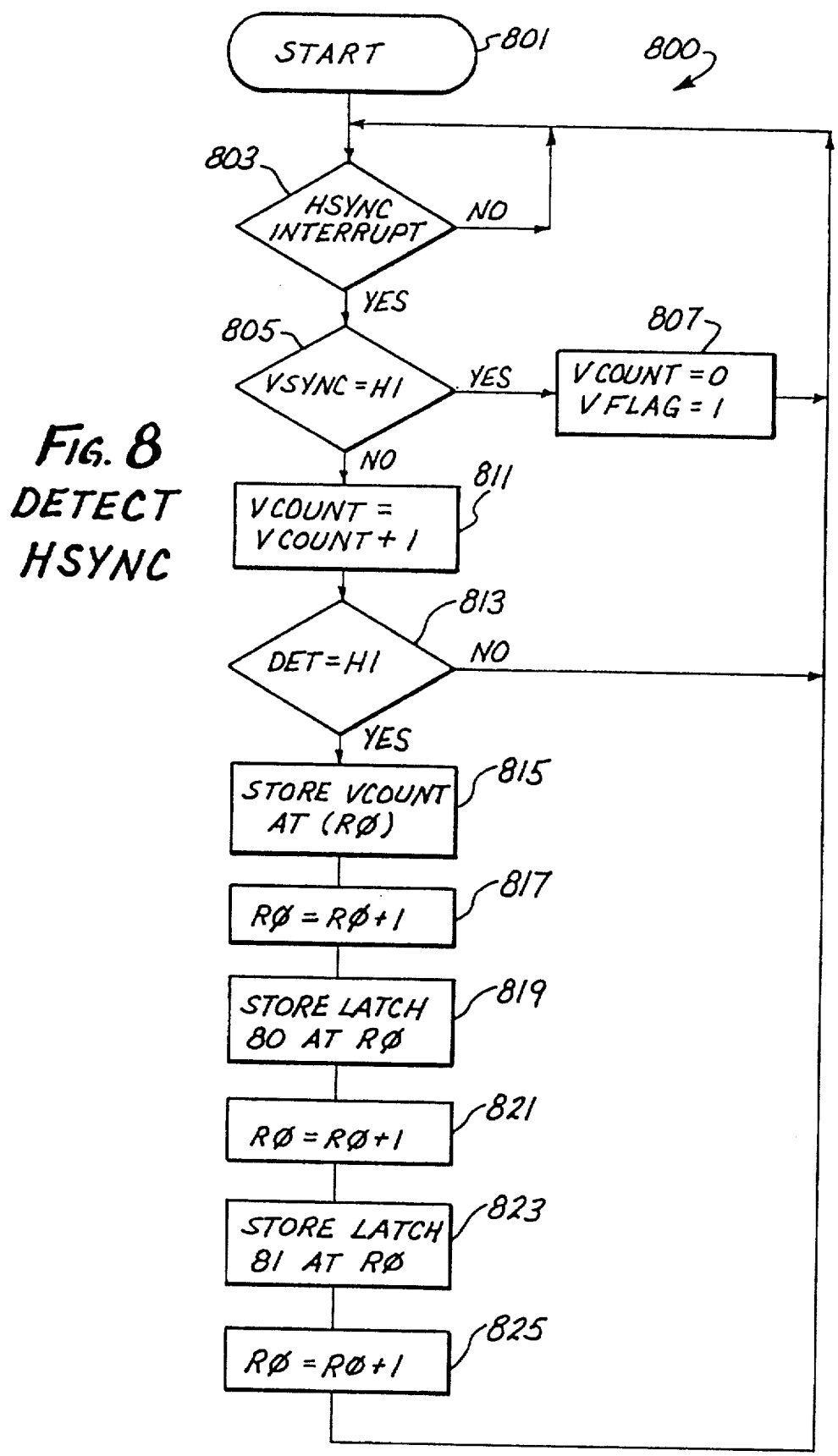

Considering now the DETECT HSYNC subroutine module 800 in greater detail with reference to FIGS. 8 and 9, the DETECT subroutine module 800 runs independently of the EXECUTE routine 100A as previously described with reference to FIG. 7. In this regard, the DETECT HSYNC subroutine module 800 starts at 801 and proceeds to instruction 803 when the signal processing unit 25 is initialized. At decision instruction 803 the program waits for an interrupt signal HSYNC INTERRUPT to be triggered by the HSYNC signal generated by the timing generator 48. In this regard, at the end of every horizontal scan line received from the image sensor 14, an interrupt is triggered by the HSYNC signal on conductor 84 which is connected to the INT1 input terminal of microprocessor 49.

When the HSYNC interrupt signal is received by microprocessor 49, the program advances to decision instruction 805 to determine whether the VSYNC is a positive value. If the VSYNC signal on conductor 85 (connected to the INT0 input terminal of microprocessor 49) is a positive value, it indicates the end of a scanned frame of information. In regard, the program advances to command instruction 807 which causes the vertical counter 89 to be reset to zero and sets the synchronizing flag ("VFLAG") to a positive value (VFLAG=1). The program then returns back to the decision instruction 803 to wait for another HSYNC interrupt signal to occur.

If the VSYNC signal is not a positive value when the program advances to decision instruction 805, the program will proceed to command instruction 811. In this regard, it should be understood that if VSYNC is a negative value it indicates that the image sensor 14 is in process of scanning a horizontal scan line. When the program advances to instruction 811 it causes the vertical counter 89 to be incremented by one to indicate the passing of another horizontal scan line.

After incrementing the vertical counter 89, the program proceeds to decision instruction 813 to determine whether a change in the variable DET has occurred, i.e. DET=1. If the DET signal is a positive value it indicates the occurrence of light from the light generating device 24. In this regard, the DET signal is generated by a flip flop 98 (FIG. 5) that is set by the transition of the comparator 76 via the invertors 79 A and B and reset by the microprocessor 49 when it reads the horizontal counter value stored in latch 81. If the DET signal is a false or negative value it indicates the absence of any detected light. In this event, the program returns to decision instruction 803 and waits for another HSYNC interrupt signal to occur.

If the DET signal is a true or positive value, indicating the detection of light from the light generating device 24, the program advances to command instruction 815 that causes the then current value in the vertical counter 89 to be stored in the memory of microprocessor 49. In this regard, the microprocessor includes a register RO that indicates the memory location in which the vertical counter data ("VCOUNT") is to be stored. It should be understood that when the signal processing unit 25 is initialized, register RO is set to an initial memory location value, such as memory location $30 (30 hex) as indicated in FIG. 10C, for example.

After the current value in the vertical counter 89 has been stored, the program proceeds to command instruction 817 which increments the RO register by one to point to the next available data memory location.

When the RO register has been incremented the program advances to command instruction 819 which cause the microprocessor 49 to read and store the contents of latch 80 in the memory location pointed to by the RO register.

Once the contents of latch 80 have been stored, the program goes to instruction 821 and to again increment the RO register by one to point to the next available data memory location.

After the RO register has been incremented, the program proceeds to command 823 which causes the microprocessor 49 to read and store the contents of latch 81 in the memory location pointed to by the RO register. It should also be noted, as previously indicated, that when the microprocessor 49 reads and stores the contents of latch 81 the DET flip flop is reset to a negative value.

When the contents of latch 81 have been stored, the program advances to command instruction 825 to once again increment the RO register by one to point to the next available data memory location. As soon as the RO register has been incremented, the program returns to decision instruction 803 to wait for the occurrence of another HSYNC interrupt signal.

Based on the foregoing, it should be understood that three bytes of data are stored every time the presence of light from the light generating device 24 is detected on a horizontal scan line: (1) the vertical position ($Y_1$), and the two horizontal positions ($X_{1A}$, $X_{1B}$) corresponding to the beginning and end of the detected light pulse.

FIGS. 10A and 10B are diagrammatic simulations of the light image spot 42 projected on screen 21 as shown in FIG. 3. In this regard, FIG. 10A shows a pixel map M that includes a simulated screen 21A of the screen 21 of FIG. 3 and a simulated light image 42A of the light image spot 42 as detected by the image sensor 14. The pixel map M consists of light image information concerning the simulated light image 42A. For example, in FIG. 10A the simulated light image 42A is shown covering a series of simulated scan lines shown generally at 41.

Referring now to FIG. 10B, the simulated light spot 42A is shown in a greatly enlarged manner to help illustrate the steps of the DETECT HSYNC subroutine 800 in greater detail. More particularly, as seen in FIG. 10B, the simulated light spot 42A covers three simulated horizontal scan lines 101, 102 and 103, between the simulated pixel location 95, 96, 97 and 98. In the illustrated example, the simulated light spot starts on horizontal line 101 at pixel locations 96 and 97, extends to horizontal line 102 at pixel location 95, 96, 97 and 98, and ends on horizontal line 103 with pixel locations 96 and 97.

FIG. 10C shows diagrammatically a portion of the data memory 49A of microprocessor 49 with the contents thereof illustrated at the conclusion of one frame scan with reference to the simulated light spot 42A illustrated in FIGS. 10A and 10B. In this regard, triplets of data indicating the vertical count and the two horizontal counts that represent the occurrence of detected light are stored in data memory locations DM30–DM38. Given this data, it should be understood that various computation methods which are well known to those skilled in the art may be used to locate a portion of the simulated spot of light 42A; i.e. its center, its top edge, its bottom edge, etc. The microprocessor 49 uses the CONVERT DATA subroutine 500 to make this determination. The program listing for the CONVERT DATA subroutine are given in Table I and will not be described hereinafter in greater detail.

Figure 9:
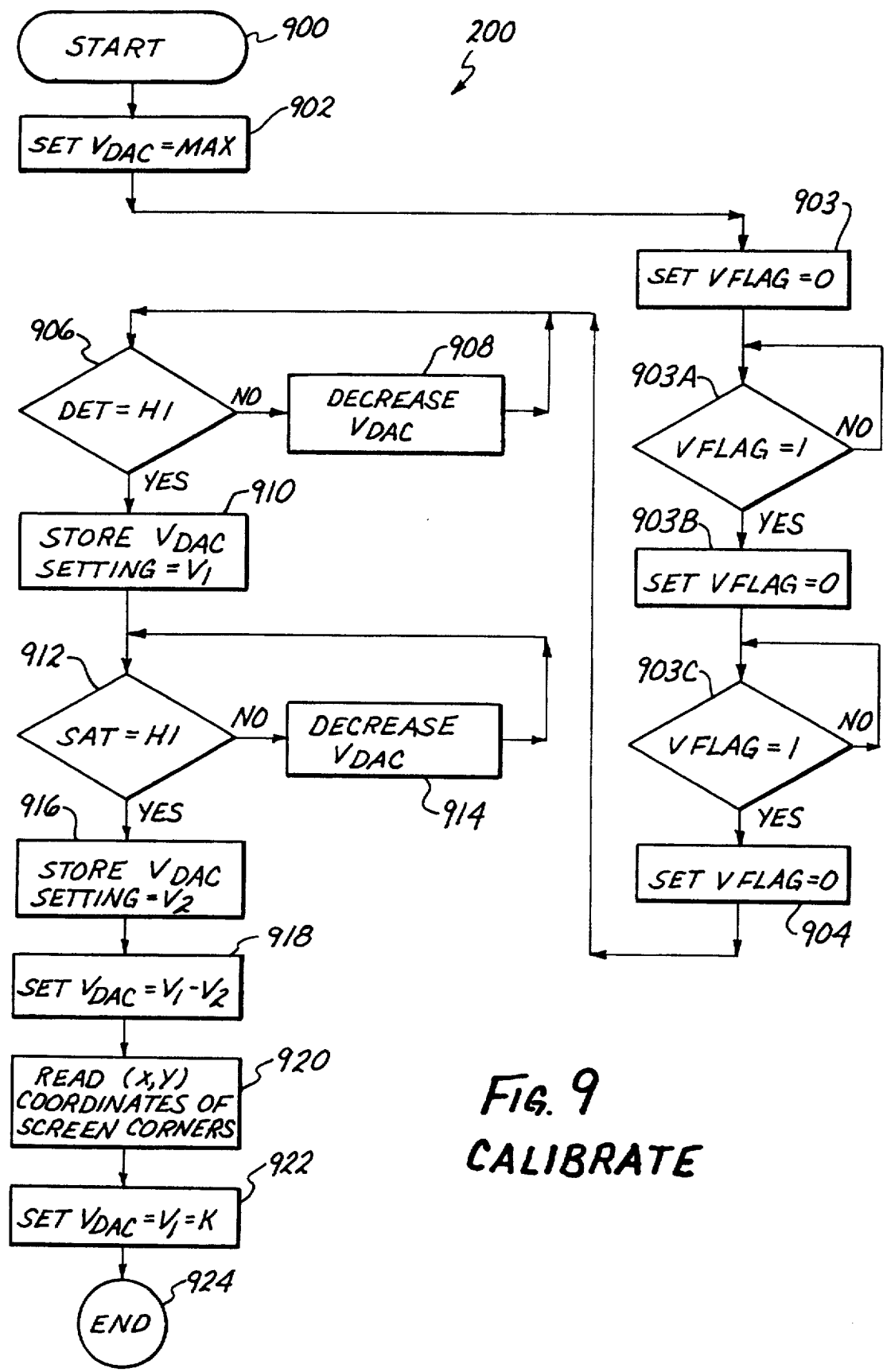

Considering now the CALIBRATE subroutine module 200 in greater detail with reference to FIG. 9, the CALIBRATE subroutine module 200 calibrates and aligns the system 11. In this regard, the CALIBRATE subroutine module 200 accomplishes two results. First, it derives a setting by the digital to analog converter 77 as shown in FIG. 5 for establishing the reference voltage level for comparator 76. Secondly, it calculates the coordinate scaling factors for converting the image sensor 14 coordinates $(X_1, Y_1)$ to the computer 16 coordinates $(X_2, Y_2)$.

Referring now to FIG. 1, the computer 16 generates a video signal on cable 17A which is converted into a displayable image by the liquid crystal display panel 13. The overhead projector 22, projects this image onto the screen 21. The system is now ready for calibration and alignment as will be explained hereinafter in greater detail.

The CALIBRATE subroutine 200 begins at 900 and proceeds to an instruction 902 which causes the output signal of the digital to analog converter 77 to be bet to its maximum output value ($V_{DAC}$=Max). The program then advances to command 903 and resets VFLAG. After resetting the VFLAG the program goes to decision instruction 903A and loops there until the VFLAG is set again. The program then proceeds to instruction 903B and again resets the VFLAG. After VFLAG has been reset, the program goes to decision box 903C and loops there until the VFLAG is set again. Instructions 903 through 903C assure that the image sensor 14 has scanned through at least one complete frame before calibration of the system takes place. After detecting that the VFLAG is set, the program goes to instruction 904 and again resets the VFLAG. The program then advances to decision instruction 906 to determine whether the DET variable is a positive value indicating that light has been detected. If the DET variable is not a positive value, the program goes to command instruction 908 and decreases the reference level voltage 78 generated by the digital to analog converter 77. The program then returns to instruction 906. This loop is repeated until the reference level voltage 78 generated by digital to analog converter 77 is set at a value that is adjusted to just detect the light displayed on screen 21. This reference voltage level is called $V_1$.

When there is a change in the DET variable, the program advances from decision instruction 906 to command instruction 910 which cause the microprocessor 49 to store the digital value that establishes the reference voltage level V1. After the digital value has been stored, the program advances to decision instruction 912 in which a determination is made whether a SATFLAG has been generated the microprocessor 49 indicating that light generated by the computer 16 and displayed on screen 21 is detected on every horizontal scan light of the image sensor 14. This represents a "saturated" condition where the reference level voltage established by the microprocessor 49 is so low that all room and projector light is detected.

If the SATFLAG is not a positive value, the program advances to command 914 which cause the reference level voltage to be set to a lower value so light can be detected from every horizontal line on screen 21. The reference level voltage at which light can be detected on every horizontal line is called V2.

The program advances from instruction 914 back to decision instruction 912 and repeats the described loop until the SATFLAG changes.

When the SATFLAG goes to a positive value, the program advances to command instruction 916 which causes the microprocessor 49 to store the digital value that establishes the reference voltage level V2. After the digital value has been stored, the program advances to command instruction 918 which cause the microprocessor 49 to generate a digital value for setting the output signal 78 of the digital to analog converter 77 to a value midway between $V_1$ and $V_2$ (SET $V_{DAC}=V_1-V_2$. This midpoint reference value is used for detecting the boundaries of the screen 21. The midway setting is an example - depending on the system configuration including projector lamp wattage, distance to the screen, etc. a more optimal value might be empirically determined.

After the midpoint reference values have been established the program advances to command instruction 920 which causes the microprocessor 49 to read and store the projector generated light produced at the corners of the screen 21.

After the coordinates are read and stored the coordinates are transmitted to the computer 16. In this regard, the computer is now correlates the $(X_1, Y_1)$ coordinate data sent by the processor 25 with the actual $(X_2, Y_2)$ coordinate data used to generate the detected light at the respective corners of the screen 21. After the coordinates are transmitted to computer 16, the program advances to command instruction 922 which cause the microprocessors 49 to set the reference level voltage 78 at a voltage level K above $V_1$. This is called the threshold value for detecting the light generated by light generating device 24. This program then advances to instruction 924 which permits the program to return to the main program (instruction 706). The value K may vary from system to system. The above describes an automatic method of calibration in which the edges of the screen 21 are detected and used as reference coordinates.

A manual calibration method is also possible, as described below.

Computer 16 upon reception of a "calibrate" command intensifies a corresponding reference point at a screen corner, such as 30A (FIG. 3) and prompts the user to point the light generating device 24 to the accented point. When the user points the light generating device 24 to the highlighted point (30A) the coordinate signals are stored and transmitted to computer 16 for verification with the previously detected point. If there is verification, the next corner coordinate, such as 30B (FIG. 3) is verified by repeating the above described process. If there is no verification, the computer 16 prompts the user to repeat the process just described with reference to the unverified corner. In this manner, the computer 16 enables the signal processing unit 25 to be properly calibrated and aligned.

Considering now the CONVERT subroutine 500 in greater detail with reference to FIG. 11, the CONVERT subroutine module 500 scales the coordinate reference data stored in the data memory of the microprocessor 49 into scaled coordinate data for use by the computer 16. After scaling the data, the program formats the data to emulate a graphic tablet output signal which is stored in a buffer for transmission to the computer 16.

The CONVERT subroutine 500 begins at 501 which is entered from the EXECUTE routine 100A when the CONVERT subroutine module 500 is called at instruction 724. From 501, the program proceeds to instruction 502 which causes the microprocessor 49 to retrieve the data stored in memory by the DETECT HSYNC routine 800. The program then proceeds to instruction 503 and retrieves the scale factor data stored by the CALIBRATE subroutine 200 when it read and stored the coordinates of the screen corners at instruction 920. After the scale factor data has been retrieved, the program advances to instruction 504 and scales the vertical coordinate data for the first byte of information. The program then goes to instruction 505 and formats the data for transmission to the computer 16. After the data has been formatted, the program goes to instructions 507 to 509 and repeats the above described steps for the horizontal coordinate data. The program then advances to decision instruction 510 to determine whether all the stored coordinate data has been converted and formatted. If all the data has not been converted and formatted the program returns to instruction 502 and repeats all of the above described steps. If all the data has been converted and formatted the program goes to instruction 512 which returns the program to EXECUTE subroutine 100.

Figure 2:
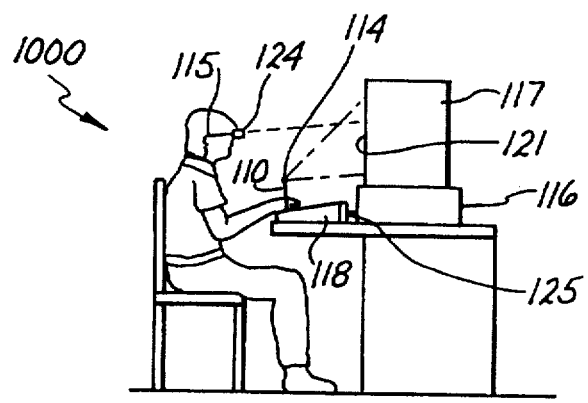
FIG. 2 is a diagrammatic view of another computer input system, which is also constructed in accordance with the present invention.

Referring now to the drawings, and more particularly to FIG. 2 thereof, there is illustrated another computer input system 1000 for controlling the movement of an image of a cursor or the like and which is also constructed in accordance with the present invention.

The computer input system 1000 generally includes an image or light detection system 110, a conventional personal computer 116 having a video monitor 117 and keyboard 118, and a light generating device 124. The light generating device 124 is adapted to be mounted on the frame of a conventional pair of eyeglasses 115. The device 124 generates light which may be directed by a user to a monitor screen 121 having computer generated video image signals displayed thereon. In this regard, the light detection system 110 detects the presence of the light projected on the screen 121 of monitor 117 by the light projecting device 124 and generates an input signal which is coupled to the computer 116. The computer 116 responds to the input signal generated by the light detection system 101 to change the computer generated information displayed on the video monitor 117 in accordance with the information contained in the input signal. The input signals generated by the light generating device 124 are substantially identical to the coordinate reference signals generated by the signal processing unit 25 of FIG. 1 and 3.

F. DIRECT VIEWING MONITOR SYSTEM

Considering now the image detection system 110 in greater detail, the image detector system 110 generally comprises a charge coupled device image sensor 114. Image sensor 114 is substantially similar to image sensor 14 except that includes a different housing unit and is adapted to be telescopically mounted to the keyboard 118. In this regard, the image sensor 114 is disposed on keyboard 118 so that it can receive the light images projected onto screen 121 by the light generating device 124. The image detection system 1000 also includes a signal processing unit 125 which is disposed on the keyboard 118. The signal processing unit 125 is coupled to the computer 116 via a keyboard cable (not shown). The signal processing unit 125 is substantially similar to signal processing unit 25 and will not be described hereinafter in greater detail.

In operation, after the system 110 has been calibrated as previously explained with reference to system 10, computer 116 generates a video output signal that is coupled to the video monitor 117. The video monitor 117 converts the video signal into a visual image which is displayed on the monitor screen 121. A user, for example, then directs the light projection from device 124 to a designated portion of the computer generated image on screen 121 to produce a spot of light on the screen which is superimposed over the visual image being displayed on the monitor 117. The image sensor 114 detects the presence of the generated light and produce a video signal which is transmitted to the signal processing unit 125. The signal processing unit 125 converts the video signal received from the image sensor 114 into a computer input signal that is transmitted to the computer 116. Computer 116 receives the input signal, converts the signal into a command signal and generates a modified video signal for changing the displayed information on screen 121 in the same manner as previously described with reference to system 10.

While particular embodiments of the present invention have been disclosed, it is to be understood that various different modifications are possible and are contemplated within the true spirit and scope of the appended claims. For example, the images being generated can appear on a large projection screen, a computer monitor screen, a laser projector, or any other suitable surface on which the images can appear. There is no intention, therefore, of limitations to the exact abstract or disclosure herein presented.

What is claimed is:

1. An interactive optical input system for position control of equipment produced images, said equipment produced images including information images, comprising:

visualization projection means for causing an equipment produced image to be projected onto a remote viewing surface;

means for generating a position control image upon said surface;

light sensing means for scanning the equipment produced image and the position control image on the remote viewing surface, said light sensing means including means for determining light sensing coordinate values for said position control image;

means for storing predetermined reference coordinate values;

signal processing means responsive to the predetermined reference coordinate values and to the determined light sensing coordinate values for the position control image for converting the light sensing coordinate values for said position control image to equipment coordinate values;

means responsive to said equipment coordinate values of the position control image for generating a signal indicative of a positioning control command when said position control image is sequenced on and off; and whereby the command and the location of the position control image relative to said information image causes the equipment produced images to be modified.

2. An interactive optical input system according to claim 1, wherein the information images include menu images, wherein said signal is further indicative of a positioning point command when said position control image is sequenced on and off, and whereby the command and the location of the position control image relative to said menu images causes the equipment produced images to be modified.

3. An interactive optical input system according to claim 1, wherein the information images include button images, wherein said signal is further indicative of a positioning click command when said position control image is sequenced on and off, and whereby the command and the location of the position control image relative to said button images causes the equipment produced images to be modified.

4. An interactive optical input system according to claim 1 wherein said signal is further indicative of a positioning drag command when said position control image is sequenced on and off and whereby the command and the location of the position control image relative to the equipment produced image causes the information image to be displayed at the location of the position control image.

5. An interactive optical input system according to claim 1, further including:
means for determining the corners of the equipment produced image; and
means responsive to said corner determining means for modifying the equipment produced image.

6. An input system according to claim 5 wherein the visualization projection means includes a computer means for generating the equipment produced image and wherein the modifying means includes another computer means for facilitating the modification of the equipment produced image.

7. An input system according to claim 5 wherein the visualization projection means further includes a liquid crystal display means for generating the equipment generated image to be projected.

8. An input system according to claim 5 wherein said position control image generating means includes
a wand means for generating a beam of light to produce the position control image on said surface.

9. An input system according to claim 5 wherein the light sensing means is a charge coupled device.

10. An input system according to claim 5 wherein the modifying means modifies the equipment produced image to provide selective ones of POINT, CLICK and DRAG subroutines.

11. An input system according to claim 1, further including:
means for determining if the position control image has been detected within a particular time, and
means responsive to said determining means for calibrating the operation of the light sensing means in sensing the position control image if the position control image has not been detected within the particular time.

12. An input system according to claim 11, further including:
means for providing a reference level for distinguishing the position control image from the equipment produced image,
the reference level means being responsive to the determinations from the calibrating means for adjusting the reference level if the position control image has not been detected within the particular time.

13. An input system according to claim 12 wherein
the position control image determining means provides a raster scan in a plurality of successive horizontal lines and wherein
the reference level means includes a means for initially providing a maximum level, then for providing a first particular level indicating the detection of light by the light sensing means, then for providing a second particular level indicating the detection of light in each of the successive horizontal lines and then for providing the reference level at a particular value between the first and second particular levels.

14. An input system according to claim 11, further including
means for determining the extremities of the equipment produced image to facilitate the conversion of the light sensing coordinate values to equipment coordinate values.

15. An interactive optical input system according to claim 1, further including:

means operatively coupled to the light sensing means for distinguishing the position control image from the equipment produced image
means for determining the coordinates of the boundaries of the equipment produced image sensed by the light sensing means and
means for converting the coordinates of the position control image in accordance with the coordinates of the boundaries of the equipment produced image.

16. An input system according to claim 15, further including
means responsive to the coordinates from the boundary determining means and the position control image converting means for modifying the equipment produced image.

17. An input system according to claim 16, wherein
the equipment produced image modifying means is operative to modify the equipment produced image to provide selective ones of POINT, CLICK and DRAG subroutines.

18. An input system according to claim 15, wherein the equipment produced image modifying means is operatively coupled to the distinguishing means for preventing other data from being converted by said position control image converting means when the light sensing coordinate values determining means determines the coordinates of the position control image distinguished by the distinguishing means.

19. An interactive optical input system according to claim 1, further including:
means for distinguishing the position control image from the equipment produced image
means for determining the coordinates of the extremities of the equipment produced image; and
means responsive to the coordinates of the extremities for modifying the equipment produced image.

20. An input system according to claim 19, wherein
the modifying means is operative to modify the equipment produced image in accordance with selective ones of POINT, CLICK and DRAG subroutines.

21. An input system according to claim 19, further including
means for calibrating the operation of the distinguishing means when the distinguishing means does not distinguish the position control image from the equipment produced image within a particular period of time.

22. An input system according to claim 19, further including
means for preventing the extremity determining means from determining the coordinates of the extremities again, and for preventing the modifying means from modifying the equipment produced image in response to the position control image.

23. An input system according to claim 19, further including
means for verifying the coordinates of the extremities in accordance with the provision of the position control image at the extremities of the equipment produced image.

24. An input system according to claim 5, wherein said position control image generating means includes means for providing the position control image on the surface.

25. An input system according to claim 11, wherein said position control image generating means includes means for providing the position control image on the surface.

26. An input system according to claim 15, wherein said position control image generating means includes means for providing the position control image on the surface.

27. An input system according to claim 19, wherein said position control image generating means includes means for providing the position control image on the surface.

28. A method for controlling equipment produced images, said equipment produced images including information images, comprising:

projecting an equipment produced image onto a remote viewing surface for displaying the image thereon;

generating a position control image on said surface;

scanning the equipment produced image and the position control image on the remote viewing surface;

determining light sensing coordinate values for said position control image;

storing predetermined reference coordinate values;

responding to the predetermined reference coordinate values and to the determined light sensing coordinate values for the position control image by converting the light sensing coordinate values for said position control image to equipment coordinate values;

responding to said equipment coordinate values of the position control image for generating a signal indicative of a positioning control command when said position control image is sequenced on and off; and whereby the command and the location of the position control image relative to said information image causes the equipment produced images to be modified.

29. A method according to claim 28, wherein the information images include menu images and said signal is further indicative of a positioning point command when said position control image is sequenced on and off, the method further including causing the equipment produced images to be modified in response to the positioning point command and the location of the position control image relative to said menu images.

30. A method according to claim 28, wherein the information images include button images and said signal is further indicative of a positioning click command when said position control image is sequenced on and off, the method further including causing the equipment produced images to be modified in response to the positioning click command and the location of the position control image relative to said button images.

31. A method according to claim 28, wherein said signal is further indicative of a positioning drag command when said position control image is sequenced on and off, the method further including causing an information image to be displayed at the location of the control image in response to the positioning drag command and the location of the position control image.

32. A computer input system, comprising:

visual image projection means for causing a displayed calibration image to be projected onto a remote viewing surface, said calibration image including at least one high intensity reference area;

light sensing means for scanning the calibration image on the remote viewing surface and for determining light sensing coordinate values for said high intensity reference area;

means for converting the light sensing coordinate values for said high intensity reference area to equipment coordinate values for said high intensity reference area;

means for calculating scaling factors based on the light sensing coordinate values of the high intensity reference area with prestored reference coordinate values for said high intensity reference area;

means for storing said scaling factors; and means responsive to the stored scaling factors for converting subsequently determined light sensing coordinate values to equipment coordinate values for said high intensity reference area during normal operation of the system.

33. A computer input system according to claim 32, wherein said visual image projection means includes display means.

34. A computer input system according to claim 33, wherein said visual image projection means further includes projection means for projecting the calibration image onto said remote viewing surface.

35. A computer input system according to claim 32, wherein said light sensing means is charge couple means.

36. An input system according to claim 32, wherein said light sensing means is charge couple means for generating a video signal indicative of the presence of said calibration image;

said charge couple means including signal level means for controlling generating a detection signal in response to said calibration image only; and timing means for generating synchronizing signals to synchronize the detection signal with a series of recurring video signals for helping to calibrate the system.

37. A computer input system according to claim 35, wherein said charge couple means is a charge couple device.

38. A computer input system according to claim 32, further including:

image projecting equipment;

wherein said calibration image is defined by a plurality of X, Y equipment coordinate values;

said light sensing means including scanning means for generating a video signal including a horizontal scan line signal and a vertical scan line signal for helping to define a detected image defined by a plurality of x, y light sensing coordinate values;

said X, Y equipment coordinate values and said x, y light sensing coordinate values having substantially different values from one another;

signal processing means responsive to said video signal for generating data signals to be supplied to the equipment;

calibrating means for determining whether said signal processing means has been calibrated to generate as part of said data signals an equipment coordinate signal indicative of the X, Y equipment coordinate values of at least a portion of the calibration image generated by the equipment;

said calibrating means generating a calibration signal when it determines that said signal processing means has not been calibrated;

visual image corner intensification means for causing the luminance level to be intensified at each corner coordinate of the calibration image to a sufficient luminance level relative to the remaining portion of the calibration image so that only the luminance level of each respective corner of the calibration image is sufficient for causing said signal processing means to store x, y light sensing coordinate values for each one of the detected corner coordinates of the calibrated image;

wherein said means for calculating scaling factors is responsive to said stored x, y light sensing coordinate values and to said calibration signal for generating said scaling factors to convert x, y light sensing coordinate values to X, Y equipment coordinate values;

means for setting a calibration flag indicative that said scaling factors have been determined;

communication means responsive to said calibration flag for enabling said signal processing means to communicate to the computer that the calibration process is completed;

whereby the video signals received by said signal processing means, during each time frame interval after calibration process is completed, are scaled to X, Y equipment coordinate values and communicated to the equipment for visual image changing purposes.

39. A computer input system according to claim 38, further comprising:

signal conversion means responsive to said video signal for generating a reference signal, said signal conversion means being coupled to an adjustable reference voltage for causing said reference signal to be adjustable between a maximum value and a minimum value for calibrating purposes;

initialization means responsive to the equipment for generating a vertical retrace synchronizing flag signal for enabling said signal processing means to synchronize its operation during the occurrence of each vertical blanking interval associated with the calibration image;

comparator means responsive to said video signal and said reference signal for supplying an electrical signal to said signal processing means to facilitate the discrimination of said calibration image from background light;

position detector means responsive to said calibration signal and to said vertical retrace synchronizing flag signal for determining whether or not said electrical signal has been received by said signal processing means during any frame period between vertical blanking intervals, said electrical signal being indicative of the detection of light by said light sensing means;

detection adjustment means for generating an adjustment signal when it determines that said signal processing means has not received said electrical signal;

reference voltage adjustment means responsive to said adjustment signal to cause the adjustable reference voltage to be decreased a sufficient amount to enable said signal processing means to just detect light reflecting from said remote viewing surface;

said reference voltage adjustment means further including determination means for generating a saturation signal when a determination is made that said electrical signal is received by said signal processing means on every horizontal scan line of said light sensing means;

said saturation signal being indicative that the reference level voltage established by said reference voltage adjustment means is so low that all ambient light and all image light from the displayed visual image generated by the computer is detected for processing by said signal processing means;

said reference voltage adjustment means includes means for storing an initial reference voltage level signal indicative of that reference voltage level which is sufficient to enable said signal processing means to just process light reflecting from said remote viewing surface;

said reference voltage adjustment means further including means for storing a saturation reference voltage level signal indicative of that reference voltage level which is sufficient to enable said signal processing means to process light on every generated horizontal scan line of said light sensing means;

said reference voltage adjustment means further responsive to said saturation signal to cause the adjustable reference voltage to be decreased a sufficient amount to enable said signal processing means to process said electrical signal on every horizontal scan line of said light sensing means;

reference means responsive to said means for storing an initial reference voltage signal and to said means for storing a saturation voltage level signal for generating a detection signal indicative of a reference voltage level midway between said initial reference voltage signal and said saturation voltage level signal;

said detection signal having a value dependent upon ambient lighting conditions, projector lamp voltage, and light dispersion due to the distance between said light sensing means and the remote viewing surface;

said visual image projection means including auxiliary light generating means for causing said high intensity reference area to be superimposed on the calibration image generated by the equipment;

threshold means for causing said reference voltage adjustment means to generate a threshold voltage level signal indicative of a reference voltage value for enabling the signal processing unit to detect only light generated by said auxiliary light generating means; and wherein said auxiliary light generating means is incandescent light generating means or infrared light generating means.

40. An input system according to claim 38, wherein said calibrating means comprises:

position detection means for establishing a horizontal position signal indicative of the width of the detected calibration image;

microprocessor means for establishing a vertical position signal indicative of the height of the detected calibration image and for scaling said horizontal position signal and said vertical position signal into a surface coordinate signal; and said microprocessor means being electrically coupled to the equipment for permitting said microprocessor means to transfer said surface coordinate signal to the equipment.

41. An input system according to claim 40, wherein said position detecting means comprises:

horizontal counter means coupled to said timing generator for developing a horizontal coordinate reference data signal indicative of a pixel location of the detected calibration image; and latching means for storing the horizontal position of the beginning of the detected calibration image in a given scan line and the horizontal position of the end of the detected calibration image in the same scan line.

42. An input system according to claim 39, wherein said auxiliary light generating means is a light emitting diode.

43. An input system according to claim 39, wherein said auxiliary light generating means is a laser pointer.

44. A input system according to claim 35, wherein said light sensing means is television camera means.

45. An optical input system according to claim 32, wherein said visual image projection means includes information projection means for projecting visual images onto the remote viewing surface, said visual images indicative of equipment information;
    wherein said light sensing means generates an electrical signal indicative of equipment information;
    signal conversion means responsive to said electrical signal for generating an information signal, said signal conversion means being coupled to a reference voltage for signal control purposes;
    signal processing means coupled to said information signal for generating data control signals to be supplied to equipment to change the equipment information;
    calibration means for determining whether said signal conversion means has been calibrated for system lighting conditions, said system lighting conditions including variable ambient lighting conditions, distance variables between said information projection means and the remote viewing surface, and variable background lighting conditions for the information projection means;
    said calibration means generating a calibration signal when it determines that said signal conversion means has not been calibrated;
    reference voltage adjustment means responsive to said calibration signal for automatically adjusting the potential level of said reference voltage for system lighting conditions so that information signals generated by said signal conversion means corresponds substantially to the equipment information supplied by the equipment;
    means responsive to said reference voltage adjustment means for setting a calibration flag indicative that said signal conversion means has been calibrated; and
    communication means responsive to said calibration flag for enabling said signal processing means to communicate said data control signals to said computer.

46. A computer input system according to claim 32, further including:
    means for determining the coordinates of the extremities of the calibration image; and
    means for verifying the coordinates of the extremities in accordance with the provision of the high intensity reference area at the extremities.

47. An input system according to claim 46, wherein the calculating means is responsive to the coordinates of the extremities determined by the determining means for converting the light sensing coordinate values to equipment coordinate values.

48. An input system according to claim 46, further including:
    means for providing a reference to help distinguish the high intensity reference area from the calibration image,
    means for distinguishing the high intensity reference area from the calibration image in accordance with such reference, and
    means for adjusting the reference when the distinguishing means fails to distinguish the high intensity reference area from the calibration image within a particular period of time.

49. An input system according to claim 48, wherein said visual image projection means further includes means for displaying an equipment produced image on said surface, the system further including
    means for modifying the equipment produced image in accordance with the scaling factors.

50. A computer input system according to claim 32, further including:
    means for providing a reference for distinguishing the high intensity reference area from the calibration image;
    means for distinguishing the high intensity reference area from the calibration image; and
    means for recalibrating the reference if the high intensity reference area is not distinguished from the calibration image within a particular time period.

51. An input system according to claim 49, wherein
    the reference constitutes a first particular reference and wherein the determining means provides a scan in a plurality of horizontal lines progressively displaced in a vertical direction and wherein
    the reference providing means includes means for determining a second particular level at which the light sensing means just senses light from the high intensity reference area and the calibration image, the determining means includes means for determining a third particular level at which the light sensing means senses light in every horizontal line in the scan, and wherein the reference providing means includes means for providing the first particular reference at a particular value between the second and third particular levels.

52. An input system according to claim 50, further including
    means for determining the coordinates of the boundaries of the calibration image, and
    means for converting the high intensity reference area coordinates in accordance with the calibration boundary coordinates.

53. An input system according to claim 51, further including
    means for determining the coordinates of the boundaries of the calibration image,
    means for converting the high intensity reference area coordinates in accordance with the calibration image coordinates, and
    means for modifying the equipment produced image in accordance with the converted coordinates provided by the converting means.

54. A computer input system according to claim 32, further including:
    means for distinguishing the high intensity reference area from the calibration image,
    means for determining the coordinates of the extremities of the calibration image,
    said light sensing coordinate converting means including means for converting the high intensity reference area coordinates in accordance with the coordinates of the calibration image extremities; and
    means for inhibiting the converting of the high intensity reference area coordinates.

55. An input system according to claim 54, wherein said visual image projection means includes means for displaying an equipment produced image on said surface, the system further including
    means for receiving the converted coordinates of the high intensity reference area and for modifying the equipment produced image in accordance with such converted coordinates.

56. An input system according to claim 54, further including means for storing the determinations by the light sensing means of the coordinates of the high intensity reference area, and means for clearing the determination storing means of any storage of coordinates upon the reception by the receiving means of the converted coordinates of the high intensity reference area.

57. An input system according to claim 54, further including means for providing a reference level for distinguishing the high intensity reference area from the calibration image, the light sensing means being operative to distinguish the high intensity reference area from the calibration image in accordance with the reference level, and means for recalibrating the reference level when the distinguishing means fails to distinguish the high intensity reference area from the calibration image within a particular time interval.

58. An input system according to claim 56, further including means for providing a first reference level above which light reflected from the surface is not sensed by the light sensing means and at which light is initially sensed by the light sensing means, the light sensing means being operative to sense the calibration image and the high intensity reference area on consecutive lines, means for scanning in the successive horizontal lines the calibration image and the high intensity reference area, means for providing a second reference level at which light is detected in every horizontal line by the light sensing means, means for providing a third reference level at a particular value between the first and second reference levels, the distinguishing means being operative to distinguish the high intensity reference area from the calibration image in accordance with the third reference level.

59. An input system according to claim 58, further including means for obtaining an operation of the first reference level means in providing the first reference level, the said reference level means in providing the second reference level and the third reference level means in providing the third reference level when the distinguishing means fails to distinguish the high intensity reference area from the calibration image within a particular time.

60. An input system according to claim 46, wherein said visual image projection means includes means for providing the high intensity reference area on the surface.

61. An input system according to claim 50, wherein said visual image projection means includes means for providing the high intensity reference area on the surface.

62. An input system according to claim 54, wherein said visual image projection means includes means for providing the high intensity reference area on the surface.

63. An input system according to claim 32, further comprising:

light generating means for generating said high intensity reference area to illuminate a portion of said calibration image.

64. An input system according to claim 63, wherein said light sensing means is charge couple means for generating a video signal indicative of the presence of said high intensity reference area on the calibration image;

said charge couple means including signal level means for controlling generating a detection signal in response to said high intensity reference area only; and timing means for generating synchronizing signals to synchronize the detection signal with a series of recurring video signals for helping to produce the calibration image.

65. An input system according to claim 63, further including video signal generating equipment to generate the calibration image, wherein said visual image projection means includes display means, said display means being electrically coupled to the video signal generating equipment for displaying the calibration image, said calibration image being produced by the video signal generating equipment.

66. A computer input system according to claim 65, wherein said display means is liquid crystal display means.

67. A computer input system according to claim 66, wherein said liquid crystal display means is a liquid crystal display panel.

68. A computer input system according to claim 65, wherein said display means is a video monitor.

69. An input system according to claim 65, wherein said visual image projection means further includes projection means for projecting the calibration image onto said viewing surface.

70. A computer input system according to claim 69, wherein said projection means is an overhead projector.

71. An input system according to claim 63, wherein said light generating means is infrared light generating means.

72. A computer input system according to claim 65, wherein said charge couple means is a charge couple device.

73. An input system according to claim 65, wherein said timing means includes:

a timing generator for producing said synchronizing signals;

a resonator for producing clock signals having a predetermined time interval; and a high voltage drive electronic unit coupled to said timing generator for producing high voltage timing signals to drive said charge couple means.

74. An input system according to claim 73, wherein said predetermined time interval can be increased or decreased to increase or decrease the voltage level of said video signal; and wherein said charge couple means includes a video amplifier for generating said video signal.

75. An input system according to claim 74, wherein said means for converting includes:

position detecting means for establishing a horizontal position signal indicative of the width of the detected control image;

microprocessor means for establishing a vertical position signal indicative of the height of the detected control image and for scaling said horizontal position signal and said vertical position signal into a surface coordinate signal; and said microprocessor means being electrically coupled to the video signal generating equipment for permitting said microprocessor means to transfer said surface coordinate signal to said video generating equipment.

76. An input system according to claim 63, wherein said light generating means is a light emitting diode.

77. An input system according to claim 63, wherein said light generating means is a laser pointer.

78. An input system according to claim 75, wherein said position detecting means comprises:

horizontal counter means coupled to said timing generator for developing a horizontal coordinate reference data signal indicative of a pixel location of the detected control image; and latching means for storing the horizontal position of the beginning of the detected control image in a given scan line and the horizontal position of the end of the detected control image in the same given scan line.

79. A method of supplying input information to video signal producing means, comprising:

causing a displayed calibration image to be projected onto a remote viewing surface, said calibration image including at least one high intensity reference area;

scanning the calibration image on the remote viewing surface and determining light sensing coordinate values for said high intensity reference area;

converting the light sensing coordinate values for said high intensity reference area to equipment coordinate values for said high intensity reference area;

calculating scaling factors based on the light sensing coordinate values of the high intensity reference area with prestored reference coordinate values for said high intensity reference area;

storing said scaling factors; and responding to the stored scaling factors by converting subsequently determined light sensing coordinate values to equipment coordinate values for said high intensity reference area during normal operation of the system.

80. A method according to claim 79, further including:

using an information projection means to project a visual image onto the remote viewing surface;

generating an electrical signal in response to the projected visual image indicative of equipment information;

using signal conversion means for generating an information signal, said signal conversion means being coupled to a reference voltage for signal control purposes;

generating data control signals to be supplied to equipment to change the equipment information;

determining whether said signal conversion means has been calibrated for system lighting conditions, said system lighting conditions including variable ambient lighting conditions, distance variables between the information projection means and the remote viewing surface, and variable background lighting conditions for the information projection means;

responding to said calibration signal for automatically adjusting the potential level of said reference voltage for system lighting condition so that the information signal generated by said signal conversion means corresponds substantially to the equipment information supplied by the equipment;

setting a calibration flag indicative that said signal conversion means has been calibrated; and responding to said calibration flag for enabling said signal processing means to communicate said data control signals to said computer.

81. A method according to claim 79, further including:

sensing the calibration image and the high intensity reference area;

determining the coordinates of the boundaries of the calibration image; and converting the coordinates of the high intensity reference area to the coordinates of the boundaries of the calibration image.

82. A method as set forth in claim 81, further including:

displaying an equipment generated image on the surface; and modifying the equipment generated image in accordance with the converted coordinates of the high intensity reference area.

83. A method as set forth in claim 82, wherein the equipment generated image is modified in accordance with POINT, DRAG and CLICK subroutines.

84. A method as set forth in claim 81 wherein the high intensity reference area is distinguished from the calibration image after the high intensity reference area and the calibration image have been sensed and before the coordinates of the high intensity reference area are determined.

85. A method as set forth in claim 84 wherein a reference level is provided to distinguish the high intensity reference area from the calibration image within a particular period of time after the calibration image and the high intensity reference area are sensed.

86. A method as set forth in claim 85 wherein the reference level is recalibrated if the high intensity reference area is not distinguished from the calibration image within the particular period of time after the calibration image and the high intensity reference area are sensed.

87. A method according to claim 79, further including:

sensing the calibration image and the high intensity reference area;

providing a reference level to distinguish the high intensity reference area from the calibration image;

distinguishing the high intensity reference area from the calibration image in accordance with the reference level; and recalibrating the reference level if the high intensity reference area is not distinguished from the calibration image within a particular time after the calibration image and the high intensity reference area are sensed.

88. A method as set forth in claim 87 wherein the calibration image is formed in a plurality of lines in an image sensor, and the reference level is determined by determining a first level at which any light in the image sensor is just able to be sensed and by determining a second level at which light is able to be sensed in each line in the image sensor and by providing the reference level at a particular value between the first and second levels.

89. A method as set forth in claim 88 wherein the reference level is initially determined before the high intensity reference area is distinguished from the calibration image and wherein the reference level is recalibrated when the high intensity reference area is not distinguished from the calibration image within a particular time after the initial calibration to determine the reference level.

90. A method as set forth in claim 87 wherein the coordinates of the high intensity reference area are determined and the coordinates of the extremities of the calibration image are determined and an equipment generated image provided on the surface is modified in accordance with the positioning of the high intensity reference area relative to the extremities of the calibration image.

91. A method as set forth in claim 89 wherein the coordinates of the high intensity reference area are determined and the coordinates of the boundaries of the calibration image are determined and the coordinates of the high intensity reference area are converted to the coordinates of the boundaries of the calibration image and an equipment generated image is modified in accordance with the converted coordinates of the high intensity reference area.

92. A method according to claim 79, further including:

sensing the calibration image and the high intensity reference area;

determining the coordinates of the boundaries of the calibration image;

providing the high intensity reference area at the corners of the boundaries of the calibration image; and verifying the coordinates of the boundaries of the calibration image in accordance with the the high intensity reference area at the corners of the boundaries of the calibration image.

93. A method as set forth in claim 92, further including converting the coordinates of the high intensity reference area in accordance with the determinations of the coordinates of the boundaries of the calibration image.

94. A method as set forth in claim 92, further including modifying an equipment generated image provided on the surface in accordance with the converted coordinates of the high intensity reference area.

95. A method as set forth in claim 94 wherein the modification of the equipment generated image provided on the surface include POINT, CLICK and DRAG subroutines.

96. A method as set forth in claim 92, further including:

providing a reference level to distinguish the high intensity reference area from the calibration image, and calibrating the reference level if the high intensity reference area is not distinguished from the calibration image within a particular time.

97. A method according to claim 79, further including:

sensing the calibration image and the high intensity reference area;

distinguishing the high intensity reference area from the calibration image;

determining the coordinates of the corners of the calibration image;

determining the coordinates of the high intensity reference area; and using the coordinates determined for the high intensity reference area and the corners of the calibration image to modify an equipment generated image displayed on the surface.

98. A method as set forth in claim 97, further including disposing the high intensity reference area at the corners of the calibration image and determining the coordinates of the high intensity reference area at such positions to verify the coordinates determined for the corners of the calibration image.

99. A method as set forth in claim 97, further including:

providing a reference level, using the reference level to distinguish the high intensity reference area from the calibration image, and adjusting the reference level if the high intensity reference area is not distinguished from the calibration image within a particular time.

100. A method as set forth in claim 97, further including inhibiting the conversion of any other coordinates after the high intensity reference area is distinguished from the calibration image and until the equipment generated image is modified.

* * * * *

UNITED STATES PATENT AND TRADEMARK OFFICE
CERTIFICATE OF CORRECTION

PATENT NO. : 5,515,079
DATED : May 7, 1996
INVENTOR(S) : Lane Hauck

It is certified that error appears in the above-indentified patent and that said Letters Patent is hereby corrected as shown below:

Column 33, line 1, delete "35", and substitute therefor --33--.

Column 37, line 12, delete "given".

Column 35, line 12, delete "54", and substitute therefor --55--.
Column 32, line 54, delete "40", and substitute therefor --75--.

Column 36, line 34, delete "65", and substitute therefor --64--.

Column 36, line 36, delete "65", and substitute therefor --64--.

Signed and Sealed this

Twenty-third Day of September, 1997

Attest:

BRUCE LEHMAN

*Attesting Officer*  *Commissioner of Patents and Trademarks*